United States Patent
Mabuchi et al.

(10) Patent No.: US 7,922,007 B2
(45) Date of Patent: *Apr. 12, 2011

(54) SEPARATION MEMBRANE WITH SELECTIVE PERMEABILITY AND PROCESS FOR PRODUCING THE SAME

(75) Inventors: Kimihiro Mabuchi, Shiga (JP); Hideyuki Yokota, Shiga (JP); Katsuaki Kuze, Shiga (JP); Noriyuki Tamamura, Osaka (JP); Makoto Ono, Shiga (JP); Noriko Monden, Shiga (JP); Noriaki Kato, Shiga (JP); Hiroshi Shibano, Osaka (JP); Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 196 days.

This patent is subject to a terminal disclaimer.

(21) Appl. No.: 10/599,128

(22) PCT Filed: Mar. 18, 2005

(86) PCT No.: PCT/JP2005/004980
§ 371 (c)(1),
(2), (4) Date: Sep. 20, 2006

(87) PCT Pub. No.: WO2005/089917
PCT Pub. Date: Sep. 29, 2005

(65) Prior Publication Data
US 2007/0199891 A1 Aug. 30, 2007

(30) Foreign Application Priority Data

Mar. 22, 2004 (JP) ................ P2004-083712

(51) Int. Cl.
B01D 63/02 (2006.01)
B01D 71/68 (2006.01)
B01D 61/00 (2006.01)
(52) U.S. Cl. .......... 210/500.41; 210/500.23; 210/500.42
(58) Field of Classification Search ............... None
See application file for complete search history.

(56) References Cited

U.S. PATENT DOCUMENTS

| | | | |
|---|---|---|---|
| 4,906,375 A | 3/1990 | Heilmann | |
| 5,340,480 A | 8/1994 | Kawata et al. | |
| 5,762,798 A | 6/1998 | Wenthold et al. | |
| 5,938,929 A | 8/1999 | Shimagaki et al. | |

(Continued)

FOREIGN PATENT DOCUMENTS

EP 0 750 938 1/1997

(Continued)

OTHER PUBLICATIONS

Wienk I.M. et al., "Spinning of follow fiber ultrafiltration membranes from a polymer blend", Journal of Membrane Science, 106, 1995, p. 233-243.

(Continued)

Primary Examiner — Krishnan S Menon
(74) Attorney, Agent, or Firm — Fish & Richardson P.C.

(57) ABSTRACT

The present invention relates to a permselective separation membrane that can be used in blood purifying treatment. More particularly, the present invention relates to a polysulfone-based permselective separation membrane which has well-balanced separation properties, highly stable safety and performance, and also can be smoothly assembled into a module, and a method for producing the same.

13 Claims, 4 Drawing Sheets

U.S. PATENT DOCUMENTS

| | | |
|---|---|---|
| 6,103,117 A * | 8/2000 | Shimagaki et al. ...... 210/321.71 |
| 6,113,785 A | 9/2000 | Miura et al. |
| 6,355,730 B1 | 3/2002 | Kozawa et al. |
| 6,432,309 B1 | 8/2002 | Fuke et al. |
| 6,605,218 B2 | 8/2003 | Kozawa et al. |
| 6,693,266 B1 | 2/2004 | Yagi |
| 2001/0004976 A1 | 6/2001 | Kozawa et al. |
| 2007/0199891 A1 | 8/2007 | Mabuchi et al. |

FOREIGN PATENT DOCUMENTS

| | | |
|---|---|---|
| EP | 0 927 572 | 7/1999 |
| EP | 0 997 182 | 5/2000 |
| JP | 58-114702 | 7/1983 |
| JP | 61-232860 | 10/1986 |
| JP | 5-54373 | 8/1993 |
| JP | 06-165926 | 6/1994 |
| JP | 06-75667 | 9/1994 |
| JP | 06-296686 | 10/1994 |
| JP | 6-339620 | 12/1994 |
| JP | 7-289863 | 11/1995 |
| JP | 07-289866 | 11/1995 |
| JP | 9-70524 | 3/1997 |
| JP | 9-70525 | 3/1997 |
| JP | 9-70526 | 3/1997 |
| JP | 9-103664 | 4/1997 |
| JP | 10-66846 | 3/1998 |
| JP | 10057476 | 3/1998 |
| JP | 10-180058 | 7/1998 |
| JP | 10-230148 | 9/1998 |
| JP | 11-169690 | 6/1999 |
| JP | 11-309355 | 11/1999 |
| JP | 11-309356 | 11/1999 |
| JP | 2000-140589 | 5/2000 |
| JP | 2000-157852 | 6/2000 |
| JP | 2000-210544 | 8/2000 |
| JP | 2000-254222 | 9/2000 |
| JP | 2000-300663 | 10/2000 |
| JP | 2000-340356 | 12/2000 |
| JP | 2000-350926 | 12/2000 |
| JP | 2001-38170 | 2/2001 |
| JP | 3193262 | 5/2001 |
| JP | 2001-170167 | 6/2001 |
| JP | 2001-170171 | 6/2001 |
| JP | 2001-190934 | 7/2001 |
| JP | 3314861 | 6/2002 |
| JP | 2003-175320 | 6/2003 |
| JP | 2003-175321 | 6/2003 |
| JP | 2003-175322 | 6/2003 |
| JP | 2003-201383 | 7/2003 |
| JP | 2003-245526 | 9/2003 |
| JP | 3474205 | 9/2003 |
| JP | 2003-284931 | 10/2003 |
| JP | 3551971 | 8/2004 |
| KR | 20010012689 | 2/1991 |

OTHER PUBLICATIONS

Communication issued on Nov. 22, 2010 in related EP Application No. 05721144.3.

* cited by examiner

US 7,922,007 B2

SEPARATION MEMBRANE WITH SELECTIVE PERMEABILITY AND PROCESS FOR PRODUCING THE SAME

TECHNICAL FIELD

This application claims priority on Japanese Patent Application No. 2004-83712, the contents of which are incorporated herein by reference thereto in their entirety.

The present invention relates a permselective separation membrane which can be used in blood purification therapy and, more particularly, to a polysulfone-based permselective separation membrane which has well-balanced separation characteristics, highly stable safety and performance, and also can be assembled conveniently into a module, and a method for producing the same.

BACKGROUND ART

Blood purification therapy for the treatment of renal insufficiency employs a module such as hemodialyzer, blood filter or hemodialysis filter which uses a dialyzer membrane or an ultrafiltration membrane made of cellulose, that is a natural material, cellulose diacetate or cellulose triacetate that is a derivative of the former, or a polymer such as polysulfone, polymethyl methacrylate or polyacrylonitrile as a separating member for removing uremic toxin and waste products from the blood. A module employing a hollow fiber membrane as the separating member is particularly useful in the field of dialyzer in view of such advantages as the reduction in the amount of blood extracorporeally circulated, high efficiency of removing substances from the blood and high productivity in producing the module.

Among the membrane materials described above, polysulfone resins are viewed as promising materials having high water permeability that is most fitted to the advancement in the dialysis technology. A semi-permeable membrane formed from polysulfone alone, however, has low affinity with blood since the polysulfone resin is hydrophobic, and cannot be used directly in blood treatment due to a trouble of air locking.

To solve the problem described above, it has been proposed to make a hydrophilic membrane from a polysulfone resin mixed with a hydrophilic polymer, including a method of mixing a polyhydric alcohol such as polyethylene glycol (see, for example, Japanese Unexamined Patent Publication (Kokai) No. 61-232860 and Japanese Unexamined Patent Publication (Kokai) No. 58-114702).

A method of adding polyvinyl pyrrolidone has also been disclosed (see, for example, Japanese Examined Patent Publication (Kokoku) No. 5-54373 and Japanese Examined Patent Publication (Kokoku) No. 6-75667).

The latter method that uses polyvinyl pyrrolidone is considered to be capable of solving the problems described above with such advantages as safety and economy. However, the method of rendering hydrophilicity to the membrane by adding polyvinyl pyrrolidone has such a problem that the polyvinyl pyrrolidone elutes into the purified blood during dialysis. When much of the polyvinyl pyrrolidone elutes during dialysis, polyvinyl pyrrolidone which is foreign to the human body accumulates within the body over a long period of dialysis treatment, thus giving rise to the possibility of side effects and complications. Accordingly, tolerable amount of polyvinyl pyrrolidone elution is specified in the Approval Standard for Dialysis-type Artificial Kidney Apparatus. The standard is based on the amount of polyvinyl pyrrolidone elution determined in terms of UV absorbance. Technologies for examining the effect of controlling the amount of elution according to the standard have been disclosed (see, for example, Japanese Patent No. 3314861, Japanese Unexamined Patent Publication (Kokai) No. 6-165926 and Japanese Unexamined Patent Publication (Kokai) No. 2000-350926).

The problems described above can be solved by the methods described above. However, in the method of rendering hydrophilicity to the membrane by adding polyvinyl pyrrolidone, performance of the permselective separation membrane depends heavily on the amount of polyvinyl pyrrolidone contained in the inner surface of the membrane that makes contact with the blood (hereinafter referred to as inner surface) and in the opposing outer surface of the membrane (hereinafter referred to as outer surface), and therefore it is important to optimize the content of polyvinyl pyrrolidone. For example, while compatibility of the membrane with the blood can be ensured by increasing the content of polyvinyl pyrrolidone in the inner surface, too much polyvinyl pyrrolidone contained in the surface causes more polyvinyl pyrrolidone to elute into the blood. This is undesirable since accumulation of the eluted polyvinyl pyrrolidone gives rise to the possibility of side effects and complications through long period of dialysis.

When too much polyvinyl pyrrolidone is contained in the outer surface, on the other hand, the possibility of endotoxin (endotoxin system), which is contained in the dialysis solution and has high hydrophilicity, infiltrating into the blood side increases, which may lead to side effects such as pyrexia. Another problem may also arise such as difficulty in assembling the module, since the hollow fiber membranes adhere to each other via polyvinyl pyrrolidone which exists on the outer surface when the membranes are dried.

It is preferable to decrease the amount of polyvinyl pyrrolidone existing in the outer surface, for the purpose of suppressing polyvinyl pyrrolidone from infiltrating into the blood side. However, this leads to lower hydrophilicity of the outer surface, and therefore to lower affinity with the physiological saline that is used for wetting when the hollow fiber membrane is returned to wet state after it has been dried for assembling the module. This may cause a problem of lower priming property which indicates the degree of air purging during the wetting operation.

In order to solve the problems described above, such a method has been proposed as setting the amount of polyvinyl pyrrolidone contained in the dense layer of the inner surface of the permselective separation membrane within a particular range, and setting the amount of polyvinyl pyrrolidone contained in the dense layer of the inner surface at least 1.1 times the amount of polyvinyl pyrrolidone contained in the outer surface of the permselective separation membrane (see, Japanese Unexamined Patent Publication (Kokai) No. 6-165926). In other words, this technology improves compatibility with blood by increasing the amount of polyvinyl pyrrolidone contained in the dense layer of the inner surface, and suppressing the hollow fiber membranes from sticking to each other when the membranes are dried, by decreasing the amount of polyvinyl pyrrolidone contained in the outer surface. This technology not only solves the problem of sticking of the membranes but also mitigates the problem of infiltration of the endotoxin (endotoxin system) contained in the dialysis solution into the blood side. However, since the amount of polyvinyl pyrrolidone contained in the outer surface is too small, it may lead to another problem of lower priming performance.

A method has been disclosed for mitigating one of the problems described above, that endotoxin (endotoxin system) contained in the dialysis solution infiltrates to the blood side, by setting the contents of polyvinyl pyrrolidone in the inner surface, the outer surface and the intermediate layer of the permselective separation membrane to particular values (see, for example, Japanese Unexamined Patent Publication (Kokai) No. 2001-38170). This method solves one of the problems described above. However, it does not solve the other problems, for example, that the priming performance lowers. Also since the permselective separation membrane made by this method has high aperture ratio of 25% or higher in the outer surface which results in lower strength of the membrane, it may cause problems such as leakage of blood.

Further, methods have been disclosed for improving the compatibility of the membrane with blood and mitigating the problem of elution of polyvinyl pyrrolidone into the blood, by setting the content of polyvinyl pyrrolidone in the inner surface of the permselective separation membrane to a particular value (see, for example, Japanese Unexamined Patent Publication (Kokai) No. 6-296686, Japanese Unexamined Patent Publication (Kokai) No. 11-309355 and Japanese Unexamined Patent Publication (Kokai) No. 2000-157852).

The documents cited above make no mention at all to the content of polyvinyl pyrrolidone in the outer surface of the hollow fiber membrane. As a consequence, these technologies cannot solve all of the problems related to the content of polyvinyl pyrrolidone in the outer surface.

Among the problems described above, the problem of endotoxin infiltrating into the blood side is addressed by a method which is based on such a property of endotoxin (endotoxin system) that the molecule thereof has a hydrophobic moiety and can be easily adsorbed onto a hydrophobic substance (see, for example, Japanese Unexamined Patent Publication (Kokai) No. 2000-254222). Specifically, this method involves setting the proportion of polyvinyl pyrrolidone to the hydrophobic polymer contained in the outer surface of the hollow fiber membrane within a range from 5 to 25%. This method is effective in suppressing the endotoxin from infiltrating into the blood side. However, achieving this effect requires it to clean the outer surface of the membrane so as to remove the polyvinyl pyrrolidone therefrom, which takes much time leading to economical disadvantage. In Example of the patent cited above, for example, one hour each is taken in showering of warm water of 60° C. and in cleaning with hot water of 110° C.

Decreasing the content of polyvinyl pyrrolidone in the outer surface is also effective in suppressing the endotoxin from infiltrating into the blood side. However, this decreases the hydrophilicity of the outer surface, and results in lower affinity with the physiological saline used for wetting when the hollow fiber membrane is returned to wet state after it has been dried for assembling the module. This may cause a problem of lower priming property which indicates the degree of air purging during the wetting operation. In order to solve this problem, it has been disclosed to add a hydrophilic compound such as glycerin (see, for example, Japanese Unexamined Patent Publication (Kokai) No. 2001-190934 and Japanese Patent No. 3193262). However, this method has a problem that the hydrophilic compound acts as a foreign matter during dialysis and that the hydrophilic compound is susceptible to degradation such as photo-deterioration, thus having an adverse effect on the stability of the module in storage. There is also such a problem that it becomes difficult to bond with an adhesive when securing the hollow fiber membrane to the module during assembly of the module.

Meanwhile a membrane having particular values of aperture ratio and pore area in the outer surface of the membrane has been disclosed (see, for example, Japanese Unexamined Patent Publication (Kokai) No. 2000-140589).

The content of polyvinyl pyrrolidone in the inner surface has a significant influence also on the selectivity of solute separation by the permselective separation membrane. When treating the blood of a patient of chronic renal insufficiency, it is necessary to minimize the leakage of albumin which is a useful protein, while removing other proteins of low molecular weights. With regard to the selectivity of the separation membrane, a polysulfone-based permselective separation membrane having albumin permeability of 0.5 to 0.0001% has been disclosed (see, Japanese Unexamined Patent Publication (Kokai) No. 11-309356). It is true that the method disclosed in this patent document has an advantage of decreasing the albumin permeability to a very low level. However, the permselective separation membrane obtained with this method has a problem of low removal ratio of $\alpha 1$-microglobulin. In recent years much attention has been attracted to the dialysis complications as the number of patients who rely on long-term dialysis treatment increases. Accordingly, range of substances to be removed by dialysis has been expanding from substances of low molecular weights such as urea, uric acid and creatinine to those of medium molecular weights of around 5,000 Daltons and further to low-molecular weight proteins of 10,000 Daltons or larger. Thus while it is required to efficiently remove uremia-causing substances having molecular weights represented by ($\alpha 1$-microglobulin contained in blood, the method of Japanese Unexamined Patent Publication (Kokai) No. 11-309356 which provides low selectivity of separating proteins cannot meet this requirement.

Meanwhile a polysulfone-based permselective separation membrane has been disclosed which has sieving coefficient of egg-white albumin of 0.2 or higher (see, Japanese Unexamined Patent Publication (Kokai) No. 7-289863). The permselective separation membrane disclosed in the document has an advantage of being capable of efficiently removing uremia-causing substances. However, it has a disadvantage of having a high removal ratio for useful proteins. Thus there is strong demand for the development of a permselective separation membrane that has well-balanced capabilities of removing both albumin and $\alpha 1$-microglobulin.

For a case where a hollow fiber membrane bundle is dried by the irradiation of microwave, such a method is proposed to lower the output power of microwave when the mean water content is from 20 to 70% by weight (see, Japanese Unexamined Patent Publication (Kokai) No. 2003-175320, Japanese Unexamined Patent Publication (Kokai) No. 2003-175321 and Japanese Unexamined Patent Publication (Kokai) No. 2003-175322). While these documents describe a sequence of drying first with output power of 30 kW, then about 21 kW, no mention is made to a technique of irradiating with microwave under a reduced pressure. Although the normal drying process and the use of microwave are described, it is not described to combine microwave and reduced pressure. While the documents show consideration to the uniformity of drying between the central region and the periphery of the hollow fiber membrane bundle, no consideration is given to the uniformity of drying in the longitudinal direction of the hollow fiber membrane bundle.

DISCLOSURE OF THE INVENTION

Through research into the elution behavior of polyvinyl pyrrolidone, the present inventors found that extract liquid obtained by a test method specified in the Approval Standard for Dialysis-type Artificial Kidney Apparatus cited previously includes hydrogen peroxide which cannot be measured by the known UV absorbance analysis. It was found that the presence of hydrogen peroxide accelerates oxide degradation of polyvinyl pyrrolidone and leads to lower storage stability as increasing amount of polyvinyl pyrrolidone elutes while the permselective separation membrane is stored.

Methods disclosed in Japanese Patent No. 3314861, Japanese Unexamined Patent Publication (Kokai) No. 6-165926 and Japanese Unexamined Patent Publication (Kokai) No. 2000-350926 all evaluate particular portions of the permselective separation membrane. It was found, for example, that treatment such as drying the hollow fiber membrane during assembly of the module leads to significant variability in the amount of elution due to variations in the drying conditions, and therefore strict safety requirements cannot be satisfied by the evaluation of a particular portion. Hydrogen peroxide, in particular, even if located at a particular portion of the permselective separation membrane, causes degrading reaction of the material constituting the permselective separation membrane to start in the portion and spread to the entire permselective separation membrane. Thus the present inventors found out that the hydrogen peroxide content should be kept within a certain level throughout the length of the module and the permselective separation membrane.

Accordingly, the present invention aims at providing a permselective separation membrane which has well-balanced separation characteristics, high safety and high stability of performance, and also can be assembled conveniently into a module, and is preferably used in a blood purifier used for the treatment of patients of chronic renal insufficiency with high water permeability. The present invention also aims at providing a method for producing the permselective separation membrane economically and stably.

The present inventors completed the present invention based on a research to solve the problems described above.

The present invention provides a permselective separation membrane which is characterized in that:
(a) the permselective separation membrane comprises a polysulfone-based polymer and polyvinyl pyrrolidone as main components;
(b) when bovine blood at a temperature of 37° C. containing 30% hematocrit, 6 to 7 g/dl of total protein and sodium citrate added thereto is flowed through a module comprising the permselective separation membrane packed therein at a flow rate of 200 ml/min. and a filtration rate of 20 ml/min.,
(i) a sieving coefficient of albumin [A] becomes not less than 0.01 and not more than 0.1 after 15 minutes; and
(ii) a sieving coefficient of albumin [B] becomes not less than 0.005 and less than 0.04 after 2 hours.

The present invention also provides a method for producing the permselective separation membrane wherein a membrane forming solution and an internal liquid are discharged through a tube-in-orifice type nozzle and are, after passing an air gap, solidified in a solidification bath, while the membrane forming solution contains polysulfone-based polymer, polyvinyl pyrrolidone and a solvent with the proportion of the polysulfone-based polymer to the polyvinyl pyrrolidone being within a range from 10 to 18% by weight, the internal liquid is an aqueous solution containing 30 to 60% by weight of an amide-based solution, and the internal liquid is kept at a temperature which is 30 to 60° C. lower than the temperature of the membrane forming solution and is within a range from 0 to 40° C.

DESCRIPTION OF REFERENCE NUMERALS

Figure 1:
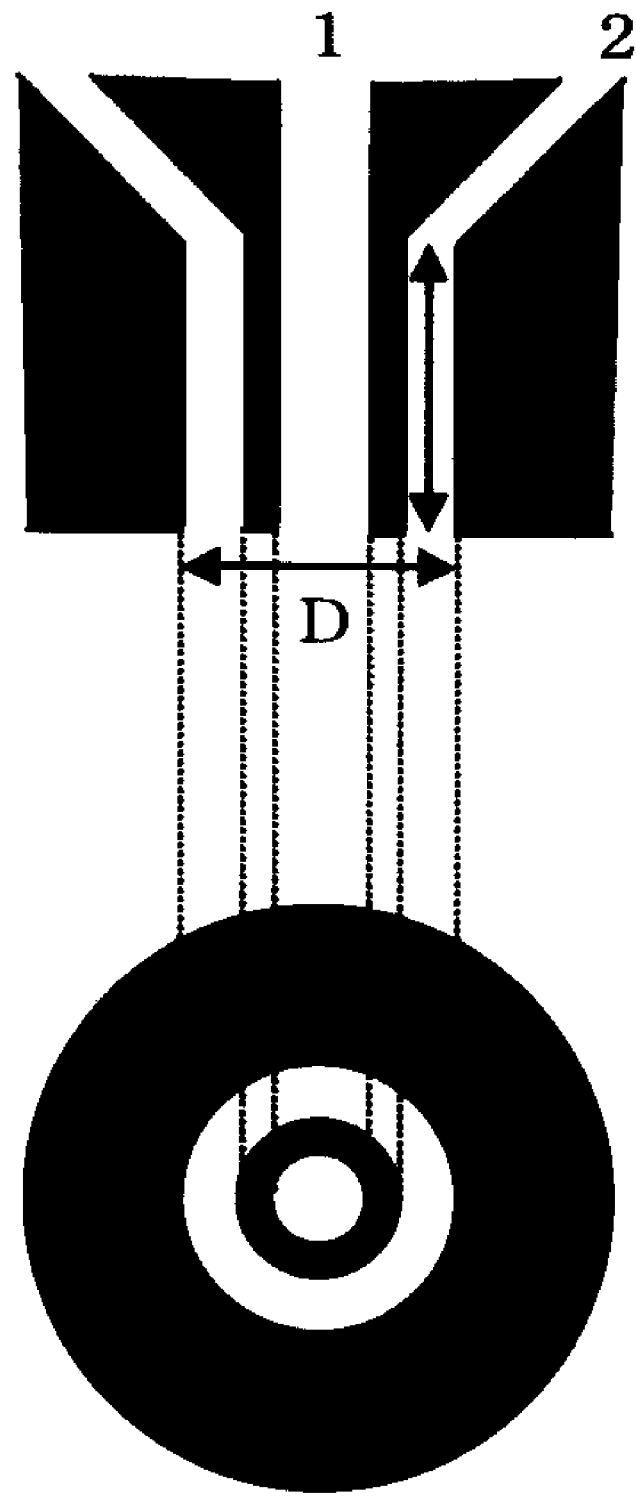
FIG. 1 is schematic view showing the tube-in-orifice type nozzle which can be used in the present invention.

1: Internal liquid discharge orifice
2: Membrane forming solution discharge orifice
L: Land length
D: Nozzle outer diameter

BEST MODE FOR CARRYING OUT THE INVENTION

The present invention will now be described in detail below.

The permselective separation membrane of the present invention is constituted from a polysulfone-based resin containing polyvinyl pyrrolidone. The polysulfone-based resin in the present invention refers collectively to resins having a sulfone bond. While there is no limitation to the polysulfone-based resin according to the present invention, commercially available polysulfone-based resins such as polysulfone resin and polyether sulfone resin which have such repeating units as represented by the following formula are easily available and are therefore preferably used.

[Chemical Formula 1]

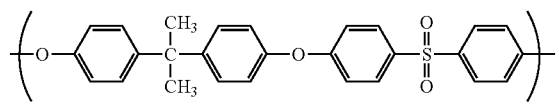

[Chemical Formula 2]

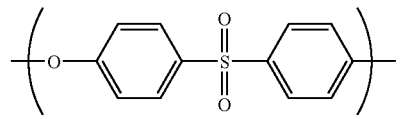

Polyvinyl pyrrolidone used in the present invention is a water-soluble polymer compound obtained by vinyl polymerization of N-vinyl pyrrolidone, and is commercially available under such product names, for example, as Luvitec from BASF AG, Plasdone from ISP and Pitzcol from DAI-ICHI KOGYO SEIYAKU CO., LTD., each being offered in variations with different molecular weights. In general, those having low molecular weights are preferable in view of the efficiency of rendering the membrane hydrophilic, and those having high molecular weights are preferable in view of decreasing the elution. Actual selection is made in accordance with the properties required of the resultant hollow fiber membrane. Polyvinyl pyrrolidone may also be used either individually with a single molecular weight, or in the form of a mixture of two or more products having different molecular weights. Alternatively, a commercialized product may be refined so as to make the molecular weight distribution sharper. Polyvinyl pyrrolidone having mean molecular weight within a range from 10,000 to 1,500,000 may be used. For example, those commercialized by BASF AG having molecular weights of 9,000 (K17), 45,000 (K30), 450,000 (K60), 900,000 (K80) and 1,200,000 (K90) may be preferably used. Either one of these may be used individually or two or more thereof may be used in combination, in accordance with the application, required characteristics and structure. According to the present invention, it is most preferable to use K90 alone.

The permselective separation membrane of the present invention is preferably produced by using polyvinyl pyrrolidone which includes 300 ppm or less hydrogen peroxide content. Hydrogen peroxide content is more preferably 250 ppm or less, further more preferably 200 ppm or less and most preferably 150 ppm or less. By limiting the hydrogen peroxide content in the polyvinyl pyrrolidone used as the raw material to 300 ppm or less, it is made possible to stabilize the elution of hydrogen peroxide in the permselective separation membrane within 5 ppm, so as to achieve stable quality of the permselective separation membrane.

Hydrogen peroxide contained in the polyvinyl pyrrolidone used as the raw material is supposedly generated through oxidization of polyvinyl pyrrolidone. In order to control the hydrogen peroxide content to 300 ppm or less, therefore, it is effective to suppress the oxidization of polyvinyl pyrrolidone in the process of producing the polyvinyl pyrrolidone.

It is also effective and recommended to employ means for suppressing the material from deteriorating during transportation and/or storage of polyvinyl pyrrolidone. For example, in preferred embodiments, the polyvinyl pyrrolidone may be contained in an aluminum foil-laminated bag which shuts off light and is filled with an inert gas such as nitrogen gas and sealed, or sealed therein together with a deoxidant. It is also preferable to carry out weighing and/or charging operation in an atmosphere substituted with an inert gas, when the package is opened to take a required quantity of polyvinyl pyrrolidone therefrom, and when storing the measured described above.

In the process of producing the hollow fiber membrane, it is preferable to employ such means as substituting the inside of a feed tank and the like in the material feed line with an inert gas. A method of decreasing the hydrogen peroxide content by recrystallization or extraction process is not excluded. When dissolving the polyvinyl pyrrolidone in a solvent, it is preferable to keep the temperature to 70° C. or lower. It is also preferable to carry out the dissolving operation in an atmosphere substituted with an inert gas.

According to the present invention, while it is preferable to use only the polyvinyl pyrrolidone described above, another hydrophilic polymer such as polyglycol described in Japanese Unexamined Patent Publication (Kokai) No. 6-165926 may also be used together within the scope of the object of the present invention.

While there is no limitation to the method for producing the permselective separation membrane of the present invention, it is preferable to employ a method which is capable of producing the hollow fiber membrane type as taught by Japanese Unexamined Patent Publication (Kokai) No. 2000-300663. As disclosed in the patent document, such a method described below may be exemplified: 16 parts by weight of polyethersulfone (4800P, manufactured by Sumitomo Chemical Co., Ltd.), 5 parts by weight of polyvinyl pyrrolidone (K-90 manufactured by BASF AG), 74 parts by weight of dimethylacetamide and 5 parts by weight of water are mixed and dissolved, the mixture being deaerated is used as the membrane forming solution together with an aqueous 50% solution of dimethylacetamide as the core liquid, which are discharged at the same time from the outside and inside of a dual-tube orifice. The discharged liquids, after traveling 50 cm in air, are introduced into solidifying water bath of 75° C. so as to form the hollow fiber membrane. After being washed in water, the hollow fiber membrane is wound up and a bundle of 10000 pieces is packed into a tube of polypropylene film with the assembly being cut to a length of 27 cm thereby making wet hollow fiber membrane. The wet hollow fiber membrane is dried by sending 60° C. air one way in the longitudinal direction of the hollow fiber membrane bundle for 20 hours.

As described above, the permselective separation membrane of the present invention can be produced by a wet membrane forming process in which the polysulfone-based polymer and polyvinyl pyrrolidone which are the constituent components of the permselective separation membrane are dissolved in a solvent. For the solvent, polar solvents which can dissolve both of the components are preferably used, the solvents including amides such as dimethylformamide, dimethylacetamide, N-methylpyrrolidone and sulfoxides such as dimethylsulfoxide. A nonsolvent which does not dissolve polysulfone-based polymer such as water or alcohol may also be used together within a limit of 10% by weight. This enables it to control the phase separation of polyvinyl pyrrolidone with respect to polysulfone-based polymer.

The permselective separation membrane of the present invention having the composition described above, when assembled into a module, preferably shows a sieving coefficient of albumin [A] not less than 0.01 and not more than 0.1 after 15 minutes and a filtration rate of 20 ml/min. through the module, and a sieving coefficient of albumin [B] not less than 0.005 and less than 0.04 after 2 hours, of flowing bovine blood at a temperature of 37° C. containing 30% hematocrit, 6 to 7 g/dl of total proteins and sodium citrate added thereto at a flow rate of 200 ml/min. (requirement 1). The sieving coefficient of albumin [A] after 15 minutes is more preferably not less than 0.01 and not more than 0.09 and still more preferably not less than 0.01 and not more than 0.08. The sieving coefficient of albumin [B] after 2 hours is more preferably not less than 0.005 and not higher than 0.035, and still more preferably not less than 0.005 and not higher than 0.03. Values of the sieving coefficient of albumin higher than those described above after 15 minutes and after 2 hours lead to higher permeability of albumin which is a useful protein, thus potentially increasing the burden on the patient. Values of the sieving coefficient of albumin lower than those described above after 15 minutes and after 2 hours are favorable in view of lower permeability of albumin, but may make it difficult to efficiently remove uremia-related substances such as $\alpha 1$-microglobulin.

Albumin is a useful protein for the living organ, and it is considered that leakage of albumin per one session of dialysis (water removal of 3 L) should be limited to 3 g or less in clinical practices. Excessive leakage of albumin may induce hypoalbuminemia or other disorder in a patient who lives on low diet. Accordingly, leakage of albumin per one session of dialysis is preferably 2.5 g or less, more preferably 2.0 g or less, and still more preferably 1.5 g or less. In the meantime, there is known toxic substances that bond with albumin in the living organ, and excessively low leakage of albumin may induce disorders. Thus leakage of albumin per one session of dialysis is preferably 0.05 g or more, more preferably 0.1 g or more, and still more preferably 0.15 g or more.

In a more preferable embodiment of the present invention, the sieving coefficient of albumin [B] after 2 hours is less than the sieving coefficient of albumin [A] after 15 minutes (requirement 2). The effects of the present invention can be achieved more conspicuously when this requirement is met. It is still more preferable that the sieving coefficient of albumin [A] after 15 minutes and the sieving coefficient of albumin [B] after 2 hours satisfy a relation of [B]/[A]=0.1 to 0.4 (requirement 3). It is more preferable to satisfy a relation of [B]/[A]=0.15 to 0.38. When the ratio [B]/[A] is too high, albumin which is a useful protein flows out at a high permeability, thus potentially increasing the burden on the patient. When the ratio [B]/[A] is too low, on the other hand, it may become difficult to efficiently remove uremia-related substances such as α1-microglobulin.

According to the present invention, it is preferable that clearance of α1-microglobulin (molecular weight 33,000) is not less than 15 ml/min (1.0 m$^2$) (requirement 4). When clearance of α1-microglobulin is too small, substances having molecular weight of about 30,000 cannot be sufficiently removed, thus making it possible that prevention of dialysis complications and mitigation of symptoms such as itching and pain become impossible. Accordingly, clearance of α1-microglobulin is more preferably not less than 18 ml/min (1.0 m$^2$), still more preferably not less than 21 ml/min (1.0 m$^2$), even more preferably not less than 24 ml/min (1.0 m$^2$), and most preferably not less than 27 ml/min (1.0 m$^2$). While clearance of α1-microglobulin is preferably higher in order to increase the removal of α1-microglobulin, excessively higher clearance makes it difficult to suppress the leakage of albumin which is a useful protein. Therefore, clearance of α1-microglobulin is more preferably 100 ml/min (1.0 m$^2$) or less, still more preferably 80 ml/min (1.0 m$^2$) or less, and even more preferably 60 ml/min (1.0 m$^2$) or less.

What is important in treating the blood of a patient of chronic renal insufficiency is to minimize the leakage of albumin which is a useful protein. However, suppressing the leakage leads to a significant decrease in the removal ratio of α1-microglobulin, etc. Through a research into the performance of permselective separation membrane that has the leakage and removal characteristics in good balance, the present inventors found that the optimum performance of the permselective separation membrane is such that, when assembled into a module, preferably shows the sieving coefficient of albumin [A] not less than 0.01 and not more than 0.1 after 15 minutes and the sieving coefficient of albumin [B] not less than 0.005 and less than 0.04 after 2 hours, of flowing bovine blood at a temperature of 37° C. containing 30% hematocrit, 6 to 7 g/dl of total protein and sodium citrate added thereto at a flow rate of 200 ml/min. and a filtration rate of 20 ml/min. In order to produce the permselective separation membrane having such an optimum performance, while it is important to control the materials, specifications thereof, producing processes, drying conditions, etc., it may also serve the purpose to analyze the relationship between the structural characteristics of the separation membrane and the sieving coefficient of albumin.

Figure 2:
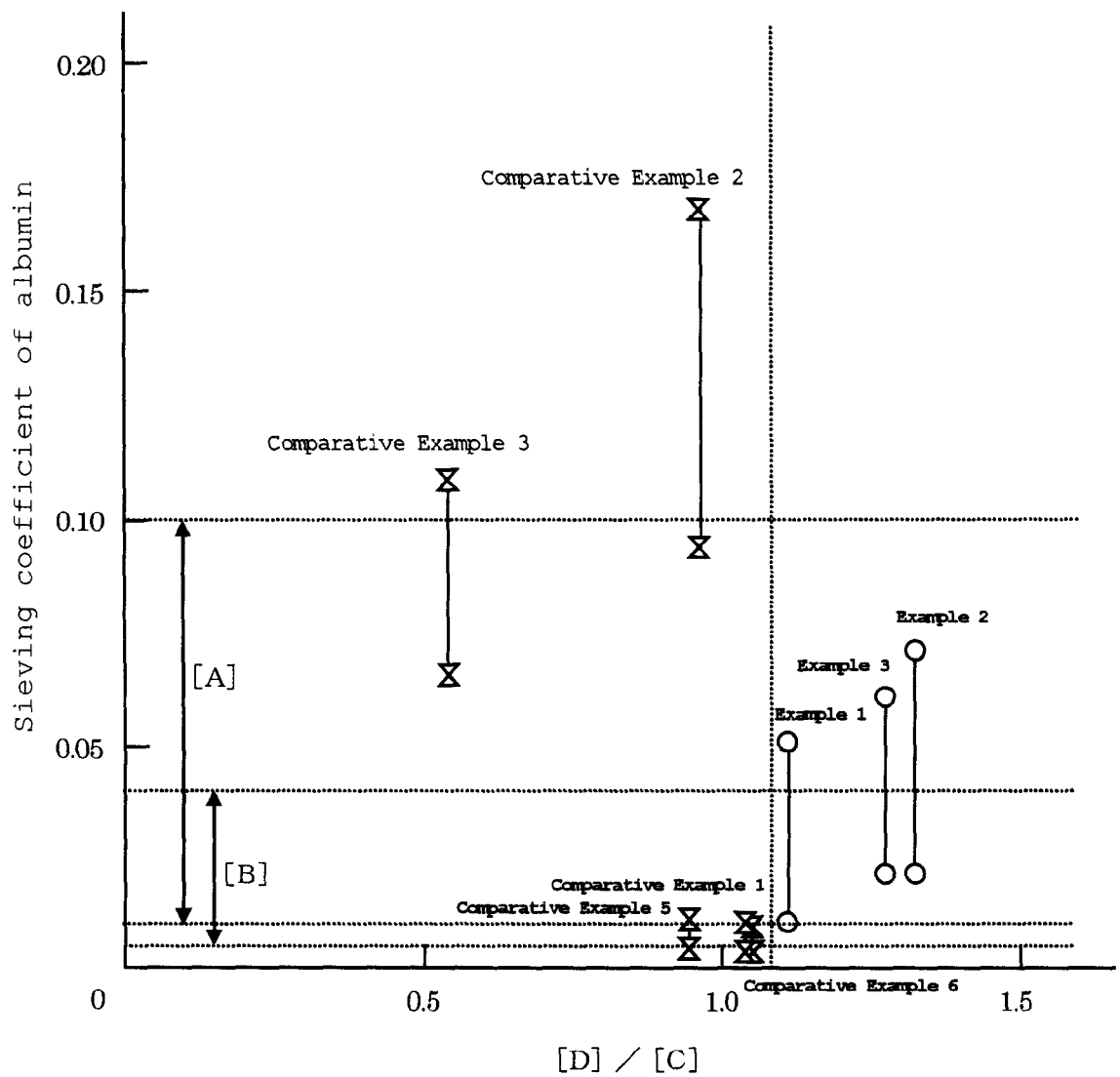
FIG. 2 is a graph showing a relation between the proportion of PVP contents in the inner and outer surfaces of a hollow fiber membrane and the sieving coefficient of albumin.

FIG. 2 shows the relation between the ratio [D]/[C], where [C] represents the polyvinyl pyrrolidone content in the uppermost layer of the inner surface of the hollow fiber membrane and [D] represents polyvinyl pyrrolidone content in the outermost layer of the hollow fiber membrane, and the sieving coefficient of albumin [A] after 15 minutes and the sieving coefficient of albumin [B] after 2 hours, respectively, which is one of the most outstanding feature of the separation membrane of the present invention. It can be seen that, when the ratio [D]/[C] is 1.1 or higher, the sieving coefficient of albumin [A] becomes not less than 0.01 and not higher than 0.1, favorably falling within the predetermined range of 0.005 or higher and less than 0.04, so that a stable separation membrane which well balances between albumin and α1-microglobulin is obtained, in Examples 1 to 3. Of course, the sieving coefficient of albumin may be affected by such factors as the molecular weight of polyvinyl pyrrolidone and the content thereof in the separation membrane, but to the extent that was verified in Examples, it can be easily understood that one of the factors which have great influence is the ratio [D]/[C] being 1.1 or higher since it brings the sieving coefficient of albumin within the predetermined range.

Figure 3:
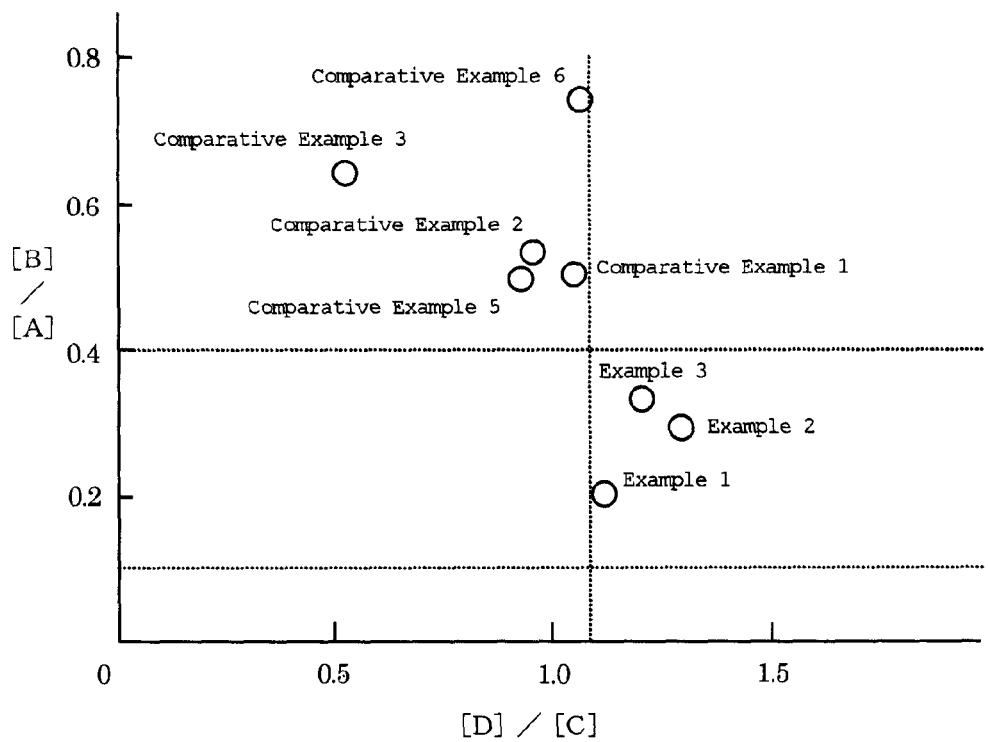
FIG. 3 is a graph showing a relation between the proportion of PVP contents in the inner and outer surfaces of a hollow fiber membrane and the change in sieving coefficient of albumin with time.

When the relation between the ratio of the sieving coefficients of albumin [B]/[A] and the ratio of polyvinyl pyrrolidone contents [D]/[C] is examined (see FIG. 3), the ratio [B]/[A] favorably falls within a range from 0.1 to 0.4 when the ratio [D]/[C] is 1.1 or higher in Examples 1 to 3, although shows values significantly deviating from the range in Comparative Examples 1 to 6.

Figure 4:
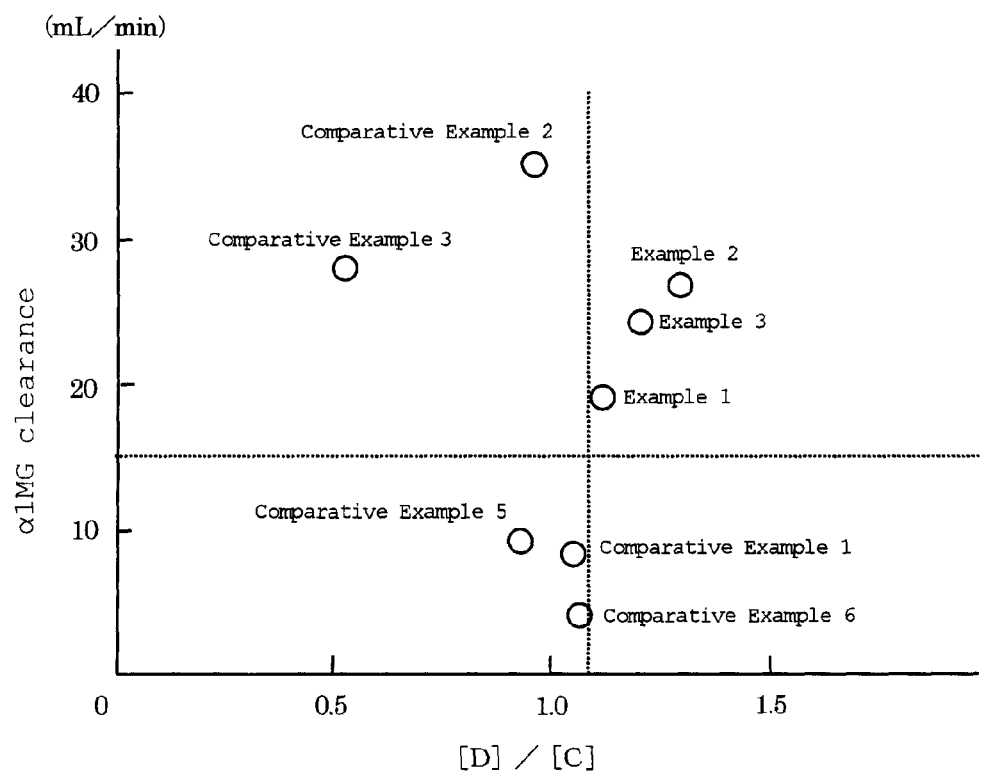
FIG. 4 is a graph showing a relation between the proportion of PVP contents in the inner and outer surfaces of a hollow fiber membrane and the α1-microglobulin clearance.

FIG. 4 shows the result of quantitative analysis of the relation between the ratio [D]/[C] and α1-microglobulin clearance. It is also shown that, in Examples 1 to 3, distribution of the α1-microglobulin clearance tends to concentrate stably around 15 ml/min (1.0 m$^2$), over a region of values of the ratio [D]/[C] around 1.1. In Comparative Examples 1 to 6, in contrast, the α1-microglobulin clearance is widely scattered indicating unstable quality of the separation membrane. By examining the results of Examples 1 to 3 shown in FIGS. 2 to 4, it can be seen that the range of the sieving coefficient of albumin, the amount of α1-microglobulin and the polyvinyl pyrrolidone content specified in the present invention have critical implications.

Figure 5:
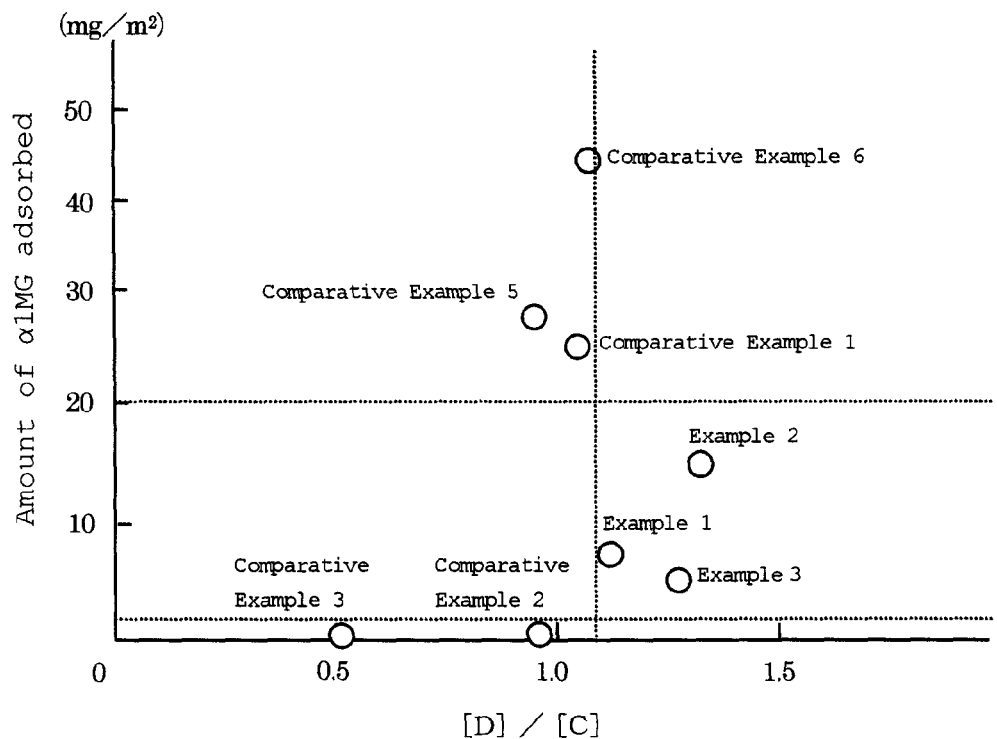
FIG. 5 is a graph showing a relation between the proportion of PVP contents in the inner and outer surfaces of a hollow fiber membrane and the amount of α1-microglobulin adsorbed.

FIG. 5 shows the result of quantitative analysis of the relation between the ratio [D]/[C] and the amount of adsorbed α1-microglobulin. No simple formulation can be set forth for the adsorption of α1-microglobulin, since the amount of adsorption is affected not only by the ratio [D]/[C] but also by various factors such as pore diameter in the membrane, structure of the membrane surface that makes contact with blood including microscopic surface unevenness, and the degree of hydrophilicity of the surface. Nevertheless, it can be easily seen that one of the factors which have great influence is the ratio [D]/[C] being 1.1 or higher since it brings the concentration of α1-microglobulin within the predetermined range.

According to the present invention, it is preferable that the polyvinyl pyrrolidone content in the uppermost layer of the blood contacting surface (inner surface) of the permselective separation membrane is within a range from 20 to 40% by weight, in view of the performance of the separating membrane. While the performance of the separating membrane depends on many factors such as grade of the polysulfone-based polymer, grade of polyvinyl pyrrolidone, total content of the polyvinyl pyrrolidone, polyvinyl pyrrolidone content in the outer surface and the method for producing the permselective separation membrane, performance of the separating membrane is heavily influenced by the content of polyvinyl pyrrolidone in the uppermost layer of the blood contacting surface.

Figure 6:
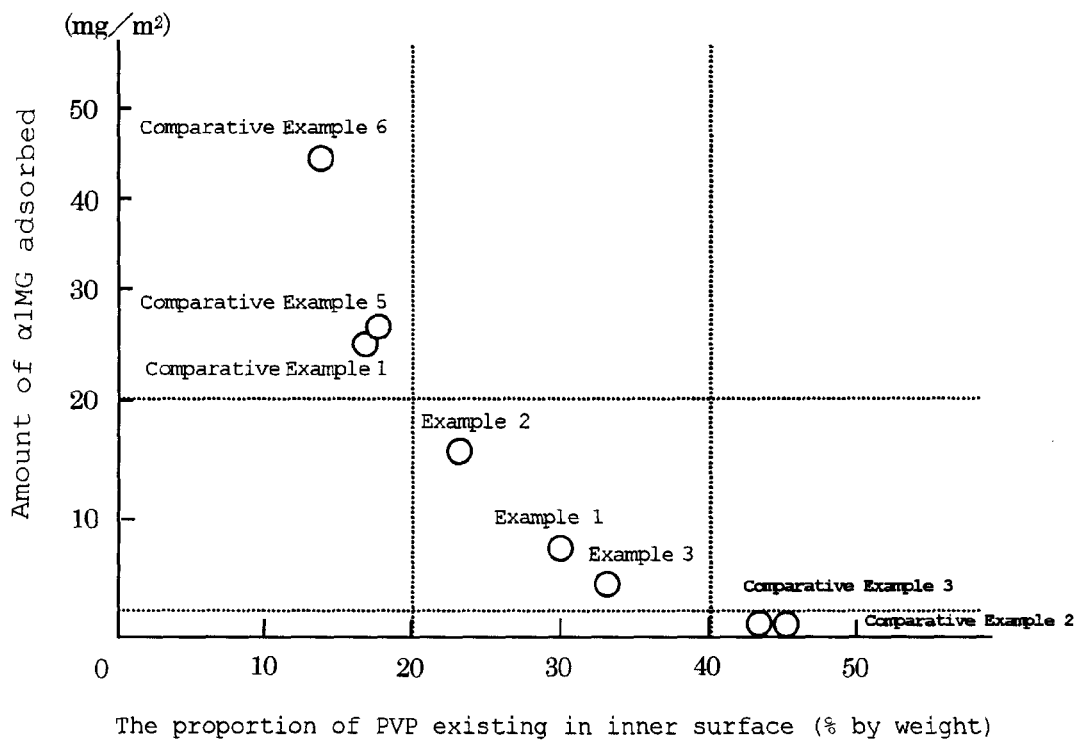
FIG. 6 is a graph showing a relation between the PVP content in the inner surface of the hollow fiber membrane and the amount of α1MG adsorbed.

Adsorption of α1-microglobulin (MG) by the permselective separation membrane of the present invention is preferably within a range from 2.0 to 20 mg/m$^2$. FIG. 6 shows the relation between the content (% by weight) of polyvinyl pyrrolidone (PVP) in the uppermost layer of the inner surface and the adsorption of α1-microglobulin. As will be clear from the figure, it is important to set the content of PVP in the uppermost layer of the blood contacting surface within a range from 20 to 40% by weight as one of the features for the performance of the permselective separation membrane. The figure quantitatively shows that the amount of adsorbed α1MG which is one of the features of the permselective separation membrane is closely related to the content of PVP that identifies the material or structure of the permselective separation membrane.

According to the present invention, while there is no limitation to the method of balancing the selectivity of separating proteins to the permselective separation membrane, the hollow fiber membrane for blood purification of the present invention preferably has such an asymmetrical structure as a skin layer is provided on the inner surface and pore diameter increases toward the outer surface. It is also preferable that the skin layer has thickness of 0.1 to 1.2 μm (requirement 6). Thickness of the skin layer which serves as an active separation layer is preferably 1.1 μm or smaller and more preferably 1.0 μm or smaller, since a thinner skin layer results in smaller resistance against the movement of solute. However, when the skin layer is too thin, such problems may occur as defects which may be involved in the pore structure tend to become conspicuous, albumin which is a useful protein cannot be suppressed from leaking or it becomes difficult to maintain the pressure resistance. Therefore, thickness of the skin layer is more preferably 0.2 μm or more, still more preferably 0.3 μm or more and even preferably 0.4 μm or more.

According to the production method described above, it is a preferred embodiment to constitute the membrane forming solution from polysulfone-based polymer, polyvinyl pyrrolidone and the solvent, setting the proportion of polyvinyl pyrrolidone to polysulfone-based polymer within a range from 10 to 18% by weight, using an aqueous solution containing 30 to 60% by weight of amide-based solvent as the internal liquid, setting the temperature of the internal liquid 30 to 60° C. lower than the temperature of the membrane forming solution, and discharging the liquid at a temperature from 0 to 40° C. The proportion of polyvinyl pyrrolidone is more preferably from 12.0 to 17.5% by weight, and still more preferably from 13.0 to 17.5% by weight. Concentration of the amide-based solvent in the internal liquid is more preferably from 32 to 58% by weight, still more preferably from 34 to 56% by weight and even more preferably from 35 to 54% by weight. Difference in temperature between the internal liquid and the membrane forming solution is preferably from 30 to 55° C., and still more preferably from 35 to 50° C. Temperature of the internal liquid is preferably from 0 to 35° C., more preferably from 5 to 30° C. and still more preferably from 10 to 30° C. Selecting such conditions optimizes the properties of the inner surface of the permselective separation membrane such as skin layer thickness, polyvinyl pyrrolidone content in the inner surface, mean pore diameter and pore diameter distribution, thereby improving the selectivity of proteins, thus enabling it to give the desired properties to the permselective separation membrane of the present invention.

Setting the temperature of the internal liquid within the range described above also enables it to suppress dissolved air contained therein from forming bubbles when the internal liquid is discharged from a nozzle. That is, by suppressing the air dissolved in the internal liquid from forming bubbles, additional effects can also be achieved such as fiber breakage right below the nozzle and prevention of the generation of knobs.

While there is no limitation to the method of differentiating the temperature of the internal liquid and the temperature of the membrane forming solution, it is preferable to use an internal liquid heat medium circulation block which enables it to control the liquid temperature separately from the temperature of the membrane forming solution, by providing a heat exchanger in the piping running from the internal liquid tank to a nozzle and in the nozzle block as the tube-in-orifice type nozzle.

In order to give well-balanced protein selectivity to the permselective separation membrane, it is preferable that polyvinyl pyrrolidone is not substantially crosslinked (requirement 8). According to the present invention, well-balanced protein selectivity can be provided by the swelling effect of polyvinyl pyrrolidone in the permselective separation membrane due to the passing of blood. That is, such an effect is utilized as, while passing of blood increases the permeability of protein at the start of treatment, polyvinyl pyrrolidone in the permselective separation membrane swells as blood passes in the course of dialysis treatment thus decreasing the permeability of albumin, so as to improve the selectivity of protein separation. When polyvinyl pyrrolidone is crosslinked, mobility of polyvinyl pyrrolidone molecules and tendency of swelling by blood decrease, thus decreasing the effect described above and decreasing the selectivity of protein separation.

According to the present invention, content of insoluble component is preferably 30% by weight or lower in proportion to the total content of polyvinyl pyrrolidone contained in the permselective separation membrane. The proportion is more preferably 25% by weight or less, still more preferably 20% by weight or less, even more preferably 15% by weight or less, particularly more preferably 10% by weight or less, and most preferably less than 5% by weight. Content of insoluble component is an index of the extent of crosslinking of polyvinyl pyrrolidone, and a high content of the insoluble component means that there is proceeding the cross-linking of polyvinyl pyrrolidone contained in the permselective separation membrane. When the content of insoluble component is too high, the effect described above decreases and therefore such problems may occur as the selectivity of protein separation lowers and the compatibility of the permselective separation membrane with blood lowers. However, it is preferable that water content in the permselective separation membrane after drying is preferably kept within a range from 1 to 10% by weight, and therefore crosslinking can occur to a certain extent due to the effect of small amount of moisture that is present during sterilization by irradiation. Such an additional effect can also be achieved as decreasing the amount of elution without adversely affecting the blood retention when passing the blood, by causing the crosslinking (turning the content insoluble) to occur very slightly. Accordingly, content of the insoluble component is preferably 0.1% by weight or more, more preferably 0.2% by weight or more, still more preferably 0.3% by weight or more, and even more preferably 0.5% by weight or more.

Content of the insoluble component can be determined from the insoluble component contained in a solution obtained by immersing the permselective separation membrane in dimethylformamide, as an expedient method. The solution is obtained by dissolving 10 g of the permselective separation membrane in 100 ml of dimethylformamide. It can be judged that cross-linking has not occurred when insoluble matter is not visually observed in the solution.

According to the present invention, thickness of the permselective separation membrane is preferably from 25 to 45 μm (requirement 7). When the membrane is too thin, pressure resistance may decrease, and the permselective separation membrane may not be stiff enough to be assembled properly in the module. Therefore, membrane thickness is more preferably 26 μm or larger, and still more preferably 27 μm or larger. When the membrane is too thick, on the other hand, clearance of α1-microglobulin may decrease and the elution of polyvinyl pyrrolidone may increase. There may also occur such problems as larger membrane thickness leads to increasing size of the module and, in the case of hollow fiber membrane, the merit of compactness of the module may be lost. Therefore, membrane thickness is more preferably 40 μm or less, still more preferably 35 μm or larger, and even more preferably 33 μm or less.

According to the present invention, content of polyvinyl pyrrolidone in the uppermost layer of the blood contacting surface (inner surface) of the permselective separation membrane is preferably from 20 to 40% by weight (requirement 9). When the polyvinyl pyrrolidone content is too small, the surface layer of the hollow fiber membrane inner surface may have lower hydrophilicity which leads to lower compatibility with blood and higher possibility of blood clotting on the surface of the hollow fiber membrane. Clotted blood may block the hollow fiber membrane, thus resulting in lower separating capability of the hollow fiber membrane and/or increasing blood retention after dialysis operation. Polyvinyl pyrrolidone content in the uppermost layer of the hollow fiber membrane inner surface is more preferably 21% by weight or more, still more preferably 22% by weight or more and even more preferably 23% by weight or more. When polyvinyl pyrrolidone content is too high, on the other hand, the amount of polyvinyl pyrrolidone which elutes into blood increases thus increasing the possibility of side effects and complications caused by the eluted polyvinyl pyrrolidone over a long period of dialysis treatment. Thus polyvinyl pyrrolidone content in the uppermost layer of the hollow fiber membrane inner surface is more preferably 38% by weight or less, and still more preferably 36% by weight or less.

Compatibility with blood is also affected by the amount of plasma proteins adsorbed. As plasma proteins which are hydrophilic proteins are adsorbed onto the blood contacting surface of the permselective separation membrane, hydrophilicity and therefore compatibility with blood of the surface are improved. According to another embodiment of the present invention, adsorption of $\alpha1$-microglobulin (molecular weight 33,000) contained in the plasma proteins, which is used as an index of the effect of mitigating the symptoms (itching, pain) and compatibility of the permselective separation membrane with blood, is preferably within a range from 2.0 to 20 mg/m$^2$ (requirement 5). $\alpha1$-microglobulin has such a characteristic as easily bond with immunoglobulin (molecular weight 100,000 or more) in the blood (plasma). When bonded with immunoglobulin, $\alpha1$-microglobulin becomes larger in size than the pore of the permselective separation membrane, and cannot be fully removed by the sieving effect only. Therefore, for the purpose of improving the effect of mitigating the symptoms, removal of $\alpha1$-microglobulin is increased by making use of the adsorption to the permselective separation membrane. When the amount of adsorbed $\alpha1$-microglobulin is too small, the permselective separation membrane has lower compatibility with blood or symptoms may not be sufficiently mitigated. Therefore, the amount of adsorption is more preferably 2.5 mg/m$^2$ or more, still more preferably 3.0 mg/m$^2$ or more, and even more preferably 3.5 mg/m$^2$ or more. When the amount of adsorbed $\alpha1$-microglobulin is too much, on the other hand, effective pore diameter may decrease and eventually the capability to remove substances having medium molecular weights and proteins having low molecular weights may decrease. Therefore, the amount of adsorption is more preferably 19 mg/m$^2$ or less, still more preferably 18 mg/m$^2$ or less, and even more preferably 17 mg/m$^2$ or less.

In order to control the amount of adsorbed 11-microglobulin within the range described above, it will be greatly helpful to optimize the polyvinyl pyrrolidone content in the uppermost layer of the inner surface of the hollow fiber membrane. In addition, the amount of adsorption is also affected by the configuration of the surface layer of the inner surface. While there is no limitation to the method of controlling the amount of adsorption in the range described above, for example, combination of production conditions described previously and those described later may be employed. Temperature of the internal liquid can have significant influence on the amount of absorption. Therefore it is important to set the internal liquid at a temperature 30 to 60° C. lower than the temperature of the membrane forming solution and keep the liquid temperature within a range from 0 to 40° C. during discharge. This optimizes the content of polyvinyl pyrrolidone contained in the uppermost layer of the inner surface. Moreover, by increasing the draft ratio during formation of the membrane under the conditions described above, microscopic streaks of surface unevenness are formed on the surface layer of the inner surface in the longitudinal direction of the hollow fiber membrane. The microscopic surface unevenness increases the surface area of the inner surface and optimizes the amount of adsorption.

In addition, the amount of $\alpha1$-microglobulin adsorbed is also affected by the degree of orientation of polyvinyl pyrrolidone on the inner surface of the hollow fiber membrane. The higher the orientation, the greater the adsorption is. Therefore, as shown in FIG. 1, it is preferable to control the shear stress of the membrane forming liquid in the tube-in-orifice type nozzle during membrane forming process within a range from $1\times10^4$ to $1\times10^8$ s$^{-1}$. When the shear stress is too low, the degree of orientation of polyvinyl pyrrolidone on the surface layer of the hollow fiber membrane becomes smaller which may lead to smaller amount of $\alpha1$-microglobulin adsorbed. Therefore the shear stress of the membrane forming liquid in the nozzle is more preferably $5\times10^4$ s$^{-1}$ or higher, still more preferably $1\times10^5$ s$^{-1}$ or higher, and even more preferably $5\times10^5$ s$^{-1}$ or higher. When the shear stress is too higher, on the other hand, polyvinyl pyrrolidone on the inner surface of the hollow fiber membrane may crystallize thereby lowering the permeability of the solute. Therefore the shear stress is more preferably $5\times10^7$ s$^{-1}$ or lower, still more preferably $1\times10^7$ s$^{-1}$ or lower, and even more preferably $5\times10^6$ s$^{-1}$ or lower.

The duration during which the membrane forming liquid receives the shear stress is also an important factor. Duration of shear stress is preferably from $1\times10^{-5}$ to 0.1 sec, more preferably from $5\times10^{-4}$ to $5\times10^{-2}$ sec, and still more preferably from $1\times10^{-4}$ to $1\times10^{-2}$ sec. In order to meet these features, the nozzle preferably has membrane forming liquid discharging hole with maximum outer diameter of 100 to 700 μm and land length of 0.1 to 5 mm. Maximum outer diameter is more preferably from 150 to 600 μm, still more preferably from 180 to 550 μm, and even more preferably from 200 to 500 μm. Use of such a nozzle makes it possible to cause the membrane forming liquid which is subjected to shear stress in the nozzle to be properly oriented after being discharged from the nozzle, so as to form microscopic unevenness in the blood contacting surface.

The amount of $\alpha1$-microglobulin adsorbed is also affected by the electrostatic charge of the blood contacting surface of the hollow fiber membrane. According to the present invention, it is effective to use RO water in the production of the hollow fiber membrane. By using RO water in the process of cleaning the hollow fiber membrane, for example, charged substance deposited on the membrane can be efficiently removed. It needs not to say that RO water does not ionic substance, and therefore does not cause ions to deposit on the membrane. The RO water used should have specific resistance preferably within a range from 0.3 to 2 MΩcm, and more preferably within a range from 0.4 to 1.9 MΩcm.

It is supposed that the amount of α1-microglobulin adsorbed contributes not only to the improvement of compatibility with blood but also to the removal of α1-microglobulin, and has favorable effect on the prevention of dialysis complications and the improvement in symptoms such as itching and pain.

According to the present invention, content of polyvinyl pyrrolidone in a layer near the blood contacting surface of the permselective separation membrane is preferably from 5 to 20% by weight (requirement 10). The content is more preferably from 7 to 18% by weight. It is preferable that the content of polyvinyl pyrrolidone in the uppermost layer of the blood contacting surface of the permselective separation membrane is higher, in view of compatibility with blood, as described above. However, there is a dilemma that higher content of polyvinyl pyrrolidone causes larger amount of polyvinyl pyrrolidone to elute into blood. Therefore, the content of polyvinyl pyrrolidone near the hollow fiber membrane inner surface is more preferably 19% by weight or less, and still more preferably 18% by weight or less. When the content of polyvinyl pyrrolidone near the inner surface is too low, polyvinyl pyrrolidone cannot be supplied to the surface layer, thus resulting in such problems as lower capability to remove the solute and lower stability of compatibility with blood over time. Therefore, content of polyvinyl pyrrolidone near the inner surface is more preferably 6% by weight or more, and still more preferably 7% by weight or more.

The dilemma described above can be avoided by satisfying the conditions described above, and it is made possible to achieve optimum conditions at a high level unattainable with the prior art. That is, it is important to set the content of polyvinyl pyrrolidone in the uppermost layer of a surface of the permselective separation membrane, which governs the compatibility with blood, at a lowest possible level that can ensure the compatibility with blood. However, while the content in the uppermost layer of a surface provides for the initial compatibility with blood, polyvinyl pyrrolidone in the uppermost layer of a surface gradually elutes into blood over a long period of dialysis, thus gradually decreasing the compatibility with blood in the course of dialysis. In one embodiment of the present invention, this problem is solved by compensating for the loss through migration of polyvinyl pyrrolidone existing in a layer near the surface into the uppermost layer. As a result, in case the content of polyvinyl pyrrolidone in the layer near the blood contacting surface is too low, there is a possibility that sustainability of the compatibility with blood cannot be sufficiently suppressed from decreasing. When the content is too high, on the other hand, the amount of polyvinyl pyrrolidone which elutes into blood may increase thus giving rise to the possibility of side effects and complications to occur during long period of dialysis.

In one embodiment of the present invention, it is preferable that content of polyvinyl pyrrolidone in the uppermost layer on non-blood contacting side of the permselective separation membrane is preferably from 25 to 50% by weight, and the ratio [D]/[C] (ratio of the content of polyvinyl pyrrolidone in the uppermost layer on non-blood contacting side to the content of polyvinyl pyrrolidone in the uppermost layer on the blood contacting surface) is preferably 1.1 or higher (requirement 11). When the content of polyvinyl pyrrolidone in the uppermost layer of a surface on non-blood contacting side (outer surface) is too low, the amount of blood protein adsorbed onto the support layer of the hollow fiber membrane increases which may decrease the compatibility with blood and the permeability. It may also deteriorate the priming performance in the case of dry membrane. Therefore, the content of polyvinyl pyrrolidone in the uppermost layer on outer surface of the hollow fiber membrane is more preferably 27% by weight or more, still more preferably 29% by weight or more, and even more preferably 31% by weight or more. When the content of polyvinyl pyrrolidone in the uppermost layer on the outer surface of the hollow fiber membrane is too high, on the other hand, such problems may occur as the higher possibility of endotoxin (endotoxin system) contained in the dialysis solution infiltrating into the blood side thereby causing fever and other side effects or hollow fiber membrane stick together via the polyvinyl pyrrolidone that exists on the surface when the membrane is dried, thus making it difficult to assemble the module properly. The content of polyvinyl pyrrolidone in the outer surface is more preferably 43% by weight or less, still more preferably 41% by weight or less, and even more preferably 39% by weight or less.

Content of polyvinyl pyrrolidone in the uppermost layer of the surface on the non-blood contacting side (outer surface) is preferably 1.1 times or more of the content of polyvinyl pyrrolidone in the uppermost layer of the surface on the blood contacting side (inner surface). Content of polyvinyl pyrrolidone can affect the shrinkage ratio of the hollow fiber membrane after forming the membrane. As the content of polyvinyl pyrrolidone increases, shrinkage ratio of the hollow fiber membrane becomes higher. When the content of polyvinyl pyrrolidone in the uppermost layer of the inner surface is higher than the content of polyvinyl pyrrolidone in the uppermost layer of the outer surface, for example, such problems may occur as microscopic wrinkles on the inner surface or breakage of the hollow fiber membrane due to the difference in shrinkage ratio between the inside and the outside. Wrinkles on the inner surface allow the blood protein and other substances to accumulate on the membrane surface as the blood flows when the membrane is used in dialysis, thus giving rise to the problem of deteriorating permeability over time. For this reason, the content of polyvinyl pyrrolidone in the outer surface is preferably set at a high level. The hollow fiber membrane of the present invention also preferably has such a structure as a dense layer is provided on the inner surface and pore diameter gradually increases toward the outer surface. That is, the porosity is higher on the outside than on the inside, so that the shrinkage ratio is higher on the outside. When such features are taken into consideration, the content of polyvinyl pyrrolidone in the uppermost layer of the outer surface is preferably 1.1 times or more of the content of polyvinyl pyrrolidone in the uppermost layer of the inner surface. More preferably, the ratio is 1.2 or higher, and still more preferably 1.3 or more.

For the reason described above, the content of polyvinyl pyrrolidone in the uppermost layer of the outer surface is preferably higher, although too high a value of this ratio makes the proportion of polyvinyl pyrrolidone to the polysulfone polymer too high, thus leading to such problems as insufficient strength, sticking of hollow fiber membrane, backflow of endotoxin during dialysis and elution of polyvinyl pyrrolidone. The ratio is more preferably 1.9 or less, still more preferably 1.8 or less and even more preferably 1.7 or less.

When the difference between the uppermost layer of the surface on the blood contacting side and the layer near the surface on blood contacting side is closely examined, two-layer structure is formed by the difference in the concentration of hydrophilic polymer. In the permselective separation membrane, since the pore diameter generally becomes larger from the skin layer (dense layer) on the blood contacting surface toward the opposite surface, the uppermost layer and the layer near the surface may constitute a two-layer structure of different densities. Thickness of each layer and the interface between the layers may vary depending on the producing conditions of the permselective separation membrane, and the layer structure exerts an influence on the performance to some extent. When it is taken into consideration the process of producing the hollow fiber membrane through solvent exchange and the fact that the uppermost layer and the layer near the surface are formed substantially adjacent to each other at the same time, the border cannot be clearly defined, although the two layers can be distinguished. Distribution curve of the concentration of the hydrophilic polymer shows continuous change in the concentration across the two layers, and it would be unrealistic to say that two distinct layer of different material behaviors are formed because discontinuity is found in the distribution curve of the hydrophilic polymer in polyvinyl pyrrolidone. Optimum range of the content of polyvinyl pyrrolidone is conveniently set as from 20 to 40% by weight in the uppermost layer and from 5 to 20% by weight in the layer near the surface. However, in view of the mechanism that polyvinyl pyrrolidone migrates while diffusing from the layer near the surface into the uppermost layer, such a constitution as 40% by weight in the uppermost layer and 5% by weight in the layer near the surface may not function satisfactorily. To sum up, it is also important to place the emphasis of design on the difference in the content of polyvinyl pyrrolidone between the two layers. When the ratio of the content of polyvinyl pyrrolidone in the uppermost layer to the content of polyvinyl pyrrolidone in the layer near the surface is set to 1.1 or higher, for example, when the difference in the content of polyvinyl pyrrolidone between the two layers is set to about 1 to 35% by weight, preferably from 5 to 25% by weight, polyvinyl pyrrolidone can migrate smoothly while diffusing from the layer near the surface into the uppermost layer. When the content in the uppermost layer is set to 32% by weight, the content in the layer near the surface is a range from 7 to 27% weight, which satisfies the feature of the ratio being from 1.1 to 10.

The content of polyvinyl pyrrolidone in the uppermost layer of the permselective separation membrane is determined from measurement by ESCA as will be described later, and gives the absolute value of the content in the uppermost layer (several angstroms to several tens of angstroms in depth from the surface) of the permselective separation membrane. The ESCA method is typically capable of measuring the polyvinyl pyrrolidone content to a depth of about 10 nm (100 Å) from the surface.

The content of polyvinyl pyrrolidone in the layer near the surface is determined from measurement by surface infrared spectroscopy (ATR method). The ATR method is capable of measuring the polyvinyl pyrrolidone content in a region from the surface to a depth of about 1000 to 1500 nm (1 to 1.5 μm) from the surface.

Contents of polyvinyl pyrrolidone in the surface on blood contacting side and in the opposite surface may also be related to the molecular weight of polyvinyl pyrrolidone. For example, solubility and the amount of elution are larger and diffusion is faster in case polyvinyl pyrrolidone of low molecular weight of about 450,000 than in the case of using polyvinyl pyrrolidone having large molecular weight of about 1,200,000. Therefore, there is a tendency that products having relatively high polyvinyl pyrrolidone content can be produced, such that contains 20 to 40% by weight in the uppermost layer of a surface and 5 to 20% by weight in the layer near the surface for the proportion of polyvinyl pyrrolidone to polysulfone-based polymer within a range from 1 to 20% by weight.

The requirements 5, 9, 10 and 11 of the present invention can be satisfied by, for example, setting the proportion of polyvinyl pyrrolidone to polysulfone-based polymer in the range described above or optimizing the conditions of forming the permselective separation membrane. Specifically, it is preferable to form two-layer structure of the uppermost layer and the layer near the surface which have different densities in the dense layer formed on the inner surface of the permselective separation membrane. It is considered that, by setting the contents of polysulfone-based polymer and polyvinyl pyrrolidone in the membrane forming liquid and concentration and temperature of the internal liquid in the ranges described above, difference is generated in the solidification rate and/or phase separation rate between the uppermost layer and the layer near the surface of the inner surface of the hollow fiber membrane, and the difference in solubility of polysulfone-based polymer and polyvinyl pyrrolidone into the solvent and/or water would create the properties of the features described above, though the mechanism is not yet clear.

With respect to the requirement 9, it is most important to optimize the drying conditions. When the wet hollow fiber membrane is dried, polyvinyl pyrrolidone dissolved in water migrates from the inside of the hollow fiber membrane toward the surface as the water moves. Drying under conditions to be described later imparts a velocity to the water movement and makes the moving speed uniform throughout the hollow fiber membrane, so that polyvinyl pyrrolidone contained in the hollow fiber membrane moves quickly to both surfaces without unevenness. Evaporation of water from the membrane surface occurs at a higher rate from the outer surface than from the inner surface of the hollow fiber membrane. Therefore, it is supposed that a larger amount of polyvinyl pyrrolidone moves toward the outer surface, so as to meet the requirement 9. In order to meet the requirement 9, method and condition of cleaning the hollow fiber membrane are also important, and are preferably optimized.

According to the present invention, it is preferable that porosity of the surface layer on non-blood contacting side of the permselective separation membrane is from 25 to 35% (requirement 12). Aperture ratio is more preferably from 27 to 33%. When the aperture ratio is too low, the hollow fiber membranes are likely to stick to each other when the permselective separation membrane is used as the hollow fiber membrane. When the aperture ratio is too high, the permselective separation membrane may not attain predetermined burst pressure, and may fail to suppress useful protein such as albumin from leaking.

While there is no limitation to the method of controlling the aperture ratio in the range described above, the method described in Japanese Unexamined Patent Publication (Kokai) No. 2001-38170 may be employed. When the method is employed, however, strength of the membrane becomes lower resulting problems such as blood leakage. This makes it impossible to satisfy the requirement 13 that the burst pressure of the permselective separation membrane be 0.5 MPa or higher in a preferred embodiment of the present invention. The burst pressure of the permselective separation membrane is an index of the pressure resistance of the permselective separation membrane assembled in a module using the permselective separation membrane comprising the hollow fiber membrane. The burst pressure is the pressure under which the hollow fiber membrane yields to the internal pressure and bursts, as the pressure of a gas acting on the inside of the hollow fiber membrane is gradually increased. Higher burst pressure leads to less incidents of breakage and pin holes of the hollow fiber membrane during use. The burst pressure of the permselective separation membrane is preferably 0.5 MPa or higher, more preferably 0.55 MPa or higher, and still more preferably 0.6 MPa or higher. The burst pressure less than 0.5 MPa may be an indication of potential defect. Although higher burst pressure is preferable, increasing the membrane thickness and/or decreasing the porosity simply for the purpose of increasing the burst pressure may lead to failure to achieve the required performance of the membrane. Burst pressure of the membrane used as the dialyzer is preferably lower than 2.0 MPa, more preferably lower than 1.7 MPa, still more preferably lower than 1.5 MPa, even more preferably lower than 1.3 MPa and particularly preferably lower than 1.0 MPa.

The feature described above was determined on the basis of finding that safety of the hollow fiber membrane during long-term dialysis cannot be sufficiently proved with blood leakage characteristic governed by macroscopic characteristics such as membrane strength known in the prior art. That is, through investigation into the physical properties of the hollow fiber type permselective separation membrane (hereinafter referred to simply as hollow fiber membrane) used in a blood purifier, the following findings were obtained. The hollow fiber membrane used in blood purification is usually subjected to leak test under pressure applied from the inside of the hollow fiber membrane or from the outside in order to check for defects in the hollow fiber membrane or blood purifier, in the last stage before shipment of the product. When a leakage is detected with pressurized air, the blood purifier is discarded as a defective product or repaired. The air pressure used in the leakage test is typically several times the guaranteed pressure (typically 500 mmHg) of the blood purifier. The present inventors found that, in the case of a hollow fiber type blood purifying membrane having a particularly high water permeability, however, the ordinary pressured leakage test may fail to detect tiny flaws, collapse or crack which may lead to breakage of the hollow fibers and/or pin holes or troubles such as blood leakage during the subsequent production process (sterilization or packaging), transportation or handling at the site of use (unpacking, priming, etc.). It was found that potential defects of the fibers which may develop into breakage of the hollow fibers and/or pin holes during clinical use cannot be detected with the pressure that is applied in the ordinary pressured leakage test, and a higher pressure is required. It was also found that it is effective to suppress the mixing of fibers having thickness deviation of the hollow fiber membrane, in suppressing the potential defects described above from occurring.

The embodiment of the present invention described above is based on the finding that safety of the hollow fiber membrane during long-term dialysis cannot be sufficiently proved with blood leakage characteristic governed by macroscopic characteristics such as membrane strength known in the prior art. In the hollow fiber membrane of the present invention, the membrane and the skin are formed very thin for the purpose of improving the permeability to substances which have molecular weights of about 30,000, represented by α1-microglobulin. This leads to the possibility that potential defects (pin hole, flaw, etc.) of the hollow fiber membrane develop problems during clinical use. Accordingly, it is very important to eliminate potential defects in addition to the macroscopic characteristics, in order to ensure safety in the present invention.

When the permselective separation membrane of the present invention is used for blood purifier, it is preferable that the hollow fiber membrane has burst pressure of 0.5 MPa or higher as described above, and water permeability of the blood purifier is 150 ml/m$^2$/hr/mmHg or higher. Lower water permeability may results in low efficiency of dialysis. Efficiency of dialysis may be increased by increasing the pore diameter and/or increasing the number of pores, but such measures may cause the problems of decreasing membrane strength and defects. Therefore, it is preferable to optimize the pore size on the outer surface so as to achieve optimum porosity in the support layer, and balance the resistance to the passage of solute and the membrane strength. Water permeability of the blood purifier is more preferably 200 ml/m$^2$/hr/mmHg or higher, still more preferably 250 ml/m$^2$/hr/mmHg or higher, and even more preferably 300 ml/m$^2$/hr/mmHg or higher. Since too high a water permeability makes it difficult to control the water removal during dialysis, water permeability is preferably not higher than 2000 ml/m$^2$/hr/mmHg, more preferably not higher than 1500 ml/m$^2$/hr/mmHg, still more preferably not higher than 1000 ml/m$^2$/hr/mmHg, further preferably not higher than 800 ml/m$^2$/hr/mmHg, and particularly preferably not higher than 500 ml/m$^2$/hr/mmHg.

While there is no limitation on the method of controlling the burst pressure to 0.5 MPa or higher, it is important and preferable as well to decrease degree of thickness deviation of the hollow fiber membrane (requirement 14). The degree of thickness deviation in the present invention refers to the variability in thickness determined by observing cross section of 100 hollow fiber membrane in the blood purifier, given in terms of the ratio of maximum value to the minimum value. According to the present invention, minimum degree of thickness deviation of the hollow fiber membrane among 100 hollow fiber membranes is preferably 0.6 or higher. Even a single hollow fiber membrane having degree of thickness deviation of the hollow fiber membrane less than 0.6 among 100 may trigger leakage during clinical use. For this reason, degree of thickness deviation of the hollow fiber membrane is given in terms of the minimum value among 100 pieces, not the average, in the present invention. The higher the degree of thickness deviation of the hollow fiber membrane, the higher the uniformity of the membrane is, thus helping suppress the potential defects from developing and improve the burst pressure. The degree of thickness deviation of the hollow fiber membrane is more preferably 0.7 or higher, still more preferably 0.8 or higher, and even more preferably 0.85 or higher. When degree of thickness deviation of the hollow fiber membrane is too low, potential defects become likely to develop thus making the burst pressure lower and blood leakage more likely to occur.

It is also preferable to set the mean pore area of the pore in the outer surface of the hollow fiber membrane within a range from 0.3 to 1.0 μm$^2$ which is effective in increasing the burst pressure. Mean pore area is more preferably 0.4 to 0.9 μm$^2$. When the mean pore area is too small, pore diameters of the entire membrane becomes smaller, and the water permeability and solute permeability may become lower. It may also cause the hydrophilic polymer that exists on the outer surface of the membrane when the membrane is dried to make the hollow fiber membranes stick to each other, thus making it difficult to assemble the module properly. When the mean pore area is too large, on the other hand, pore diameters become too large and porosity of the hollow fiber membrane becomes too high, and the burst pressure may become lower.

According to the present invention, while there is no limitation on the method of rendering the characteristic described above, it is preferable to set the ratio of the maximum value to the minimum value of the slit width of the tube-in-orifice type nozzle within a range from 1.00 to 1.11. For the spinning of the hollow fiber membrane, the tube-in-orifice type nozzle is used that has an annular member through which the membrane forming liquid is discharged and a core liquid discharge orifice disposed therein. The nozzle slit width refers to the width of the annular member provided on the outside through which the membrane forming liquid is discharged. The degree of thickness deviation of the hollow fiber membrane can be decreased by decreasing the variation of the slit width. Specifically, it is preferable to set the ratio of the maximum value to the minimum value of the slit width within a range from 1.00 to 1.11, and set the difference between the maximum value and the minimum value to 10 µm or less. The difference is more preferably 7 µm or less, still more preferably 5 µm or less, and even more preferably 3 µm or less. This enables it to control the degree of thickness deviation of the hollow fiber membrane within the preferable range.

It is preferable to filtrate the membrane forming liquid with a filter having aperture of 25 µm or smaller. Filter aperture is more preferably 20 µm or smaller, and still more preferably 15 µm or smaller. Specifically it is preferable to pass the membrane forming liquid that has dissolved uniformly through a filter installed between the dissolution tank and the nozzle. While filtration may be done at least once, it is preferable to carry out the filtration in a plurality of stages using filters having smaller apertures in the latter stages, in order to achieve higher filtration efficiency and longer service life of the filter. The filter aperture is measured according to JIS B8356:1976, where the diameter of the largest glass bead that has passed the filter medium is taken as the filter aperture (µm). The filter may be formed from any material in any structure, as long as the requirement for the aperture is satisfied. Wire mesh filters are commonly used, with varying filtration capacity and efficiency depending on the configuration such as plain weave, twill weave, plain tatami weave and twill tatami weave, thickness of the wire and the layering structure. Besides the metal filter, there is a class of sintered metal filter, which can be divided into two groups: those formed from sintered powder and those comprising consolidated metal like nonwoven fabric without weaving. Those comprising consolidated metal like nonwoven fabric without weaving are made by uniformly stacking and sintering stainless steel fibers on the order of micrometers, where the metal fibers are bonded with each other at numerous contacts so as to provide highly accurate filtration capability with less loose apertures. In addition, since this type of filter has higher porosity than other metal filters, it causes less pressure loss and has higher foreign matter retaining capability than the metal mesh filter and the sintered metal powder filter. Use of the metal mesh filter is not excluded. A metal mesh filter may have performance equivalent to or higher than that described above, through improvement of the weaving method and stacking method. Important point in selection is low pressure loss and high filtration power. When an optimum filter is used, not only foreign matter can be suppressed from mixing in by the filtration effect but also uniformity of phase separation of polysulfone-based polymer and polyvinyl pyrrolidone in the permselective separation membrane can be improved. Uniformity of phase separation in the membrane is judged by observing the outer surface of the hollow fiber membrane under a microscope as described below.

[Uniformity of Phase Separation in Permselective Separation Membrane]

Uniformity of phase separation can be evaluated by using real surface view microscope VE-7800 (manufactured by KEYENCE CORPORATION). With the hollow fiber membrane placed at 3 mm intervals and secured with a double adhesive-coated tape on a sample stage, presence of foreign matter is examined with a magnifying power of about 200 times while scanning over total length of 1 m. Presence of void can be examined by observing a cross section of the hollow fiber membrane in 30 fields of view with a magnifying power of 300 times with the hollow fiber membrane cut obliquely with a shaving blade secured with a double adhesive-coated tape on a sample stage so that the cut surface faces upward.

It is considered that uniformity of phase separation can be improved by the method described above due to the effect of dispersing a portion of polyvinyl pyrrolidone which is not well dispersed in the permselective separation membrane by filtering the membrane forming liquid with the filter of particular performance, and the effect of removing a portion of polyvinyl pyrrolidone which is not well dispersed.

The method described above makes it possible to improve the uniformity of phase separation of polysulfone-based polymer and polyvinyl pyrrolidone in the permselective separation membrane. As a result, even when the membrane thickness and the skin thickness are made very small, defects of decreased membrane strength can be suppressed from being formed due to non-uniformity of phase separation in the membrane, thus leading to improvement of the burst pressure.

It is also important to optimize the nozzle temperature. Nozzle temperature is preferably within a range from 20 to 90° C. When the nozzle temperature is low, it becomes susceptible to the ambient temperature and nozzle temperature cannot be stabilized, eventually causing unevenness in discharge of the membrane forming liquid. Therefore nozzle temperature is more preferably 30° C. or higher, still more preferably 35° C. or higher, and further preferably 40° C. or higher. When the nozzle temperature is too high, viscosity of the membrane forming liquid becomes too low, giving rise to the possibility of unstable discharge, and also the polyvinyl pyrrolidone may decompose through thermal degradation. Therefore nozzle temperature is more preferably 85° C. or lower, and still more preferably 80° C. or lower.

It is also preferable that viscosity of the membrane forming liquid is within a range from 2000 to 6000 cps, and more preferably from 3000 to 5000 cps. When the viscosity is within this range, efficiency of mixing the solution is improved and therefore such effects can be achieved as making the phase separation uniform, decreasing the unevenness in discharge from the nozzle and making degassing easier, thus leading to the improvement of burst pressure.

For the purpose of increasing the burst pressure, it is also effective to decrease flaws on the surface of the hollow fiber membrane and decreasing potential defects. Flaws may be suppressed from being generated by optimizing the material and surface roughness of the rollers and guide in the process of producing the hollow fiber membrane, and taking measures to minimize the contact between the hollow fiber membrane and the module container when assembling the hollow fiber membrane into the module container, and minimize the abrasion between the hollow fiber membranes.

According to the present invention, it is preferable to use rollers that have been mirror finished on the surface in order to prevent the surface of the hollow fiber membrane from being flawed while the hollow fiber membrane slips. The guide is preferably processed for matt finished on the surface or knurled in order to prevent contact with the hollow fiber membrane.

When inserting the hollow fiber membrane into the module container, it is preferable to insert the hollow fiber membrane, which is wrapped by a film that is embossed on the surface thereof making contact with the hollow fiber membrane, into the module container and taking the film out of the module container after inserting, rather than inserting only the hollow fiber membrane directly into the module container.

Air bubbles trapped in the hollow fiber membrane can also cause a decrease in the burst pressure. Therefore it is also preferable to suppress air bubbles from mixing into the membrane forming liquid to increase the burst pressure. One effective method for this purpose is to deaerate the polymer solution used in forming the membrane. Deaeration may be done by leaving the solution to stand still or decreasing the ambient pressure, depending on the viscosity of the membrane forming solution. For example, after reducing the pressure in the dissolution tank to −100 to −750 mmHg, the tank is closed air-tight and left to stand still for 5 to 30 minutes. This operation is repeated several times to remove air bubbles. When the pressure is reduced excessively, a greater number of degassing may be required over a longer period of time. When reducing the pressure by too little amount, higher cost may be required to increase the degree of air tightness of the system. Total treatment time is preferably from 5 minutes to 5 hours. When the treatment time is too long, polyvinyl pyrrolidone may deteriorate or decompose due to the effect of pressure reduction. When the treatment time is too short, sufficient effect of degassing may not be achieved.

According to the present invention, it is preferable to divide the permselective separation membrane into 10 sections in the longitudinal direction, and the amount of hydrogen peroxide elution measured on each section is 5 ppm or less (requirement 15).

Amounts of substances which elute from the permselective separation membrane are specified in the Approval Standard for Dialysis-type Artificial Kidney Apparatus. According to the Approval Standard for Dialysis-type Artificial Kidney Apparatus, the amount of elution from the membrane is quantitatively determined by UV absorbance analysis. The present inventors studied the behavior of elution from the membrane, and found that hydrogen peroxide which cannot be measured by the known method of UV absorbance analysis is contained in the liquid extracted from the permselective separation membrane by the test method specified in the Approval Standard for Dialysis-type Artificial Kidney Apparatus. It was also found that the presence of hydrogen peroxide lowers the storage stability, such that oxidization and deterioration of polyvinyl pyrrolidone proceed and, when the hollow fiber membrane is kept in storage, the amount of elution the polyvinyl pyrrolidone increases. Prior art technologies are all intended to evaluate particular portions of the hollow fiber membrane. The present inventors found that, when the hollow fiber membrane is treated such as drying during assembly of the module, amount of hydrogen peroxide elution varies significantly in the longitudinal direction of the hollow fiber membrane due to the variation of the drying conditions, and therefore the rigorous safety requirement cannot be satisfied by the evaluation of the particular portions only. The hydrogen peroxide which the present inventors paid attention, in particular, even if existing only in the particular portions of the hollow fiber membrane, starts deterioration of the material that forms the hollow fiber membrane and propagates to the entire hollow fiber membrane. Therefore, it is important control the hydrogen peroxide content in the longitudinal direction of the hollow fiber membrane within a certain level over the entire region.

According to the present invention, it is preferable that the amount of hydrogen peroxide elution from the hollow fiber membrane is 5 ppm or less, more preferably 4 ppm or less and still more preferably 3 ppm or less. When the amount of hydrogen peroxide elution is too much, storage stability may become lower due to oxidization and deterioration by hydrogen peroxide, thus resulting in increasing elution of polyvinyl pyrrolidone when the hollow fiber membrane is kept in storage over a long period of time. Most conspicuous indication for evaluating the storage stability is the increase in elution of polyvinyl pyrrolidone, while other indications include deterioration of hollow fiber membrane which makes the hollow fiber membrane brittle, and deterioration of polyurethane adhesive used in the assembly of the module resulting in increasing elution of polyvinyl pyrrolidone and lower safety. Increase in the amount of deterioration-related elute caused by oxidization of hydrogen peroxide during long-term storage can be evaluated by UV absorbance analysis (220 to 350 nm) specified in the Approval Standard for Dialysis-type Artificial Kidney Apparatus.

The amount of a hydrogen peroxide elution of the present invention is quantitatively determined from liquid extracted by the test method specified in the Approval Standard for Dialysis-type Artificial Kidney Apparatus. Specifically, 1.0 g is weighed from a piece of hollow fiber membrane arbitrarily taken out of the hollow fiber membrane in dry condition, to which 100 ml of RO water is added and extracted for at 70° C. for one hour so as to obtain extracted liquid.

The amount of a hydrogen peroxide elution may be controlled within the range described above, for example, by keeping the concentration of hydrogen peroxide in the polyvinyl pyrrolidone that is used as the raw material within 300 ppm. However, since hydrogen peroxide is generated also in the process of producing the hollow fiber membrane, it is also important to strictly control the conditions of producing the hollow fiber membrane. It is particularly important to optimize the drying conditions, since the amount of elution is greatly affected by the generation of hydrogen peroxide during drying in the process of producing the hollow fiber membrane. Optimization of the drying conditions can be particularly effective means in decreasing the variation of the amount of elution in the longitudinal direction of the hollow fiber membrane.

As another method of suppressing the generation of hydrogen peroxide, it is also important to carry out the dissolution of the membrane forming solution in a shorter period of time. For this purpose, it is effective to raise the dissolving temperature and/or increase the stirring rate. However, such measures tend to cause deterioration and decomposition of polyvinyl pyrrolidone due to the effects of the temperature, linear velocity of stirring and shearing force. In fact, according to the present inventors' study, peak of the molecular weight distribution of polyvinyl pyrrolidone contained in the membrane forming solution shifted toward smaller molecular weight, or a shoulder appeared in the distribution suggesting the generation of small molecules through decomposition, as the dissolving temperature was raised. Thus raising the dissolving temperature for the purpose of accelerating the dissolution of the raw material leads to the acceleration of deterioration and decomposition of polyvinyl pyrrolidone, and may cause the decomposition products of polyvinyl pyrrolidone to be blended in the permselective separation membrane. As a result, when the hollow fiber membrane thus obtained is used in the purification of blood, for example, high level of safety of the product cannot be achieved due to such problems as the elution of decomposition products into blood.

Accordingly, the present inventors attempted to blend the raw materials at a lower temperature in order to suppress the decomposition of polyvinyl pyrrolidone. Although low temperature dissolution is sought after, it leads to higher running cost to set extreme conditions such as below the freezing point. Thus the dissolving temperature is preferably within a range from 5 to 70° C., more preferably not higher than 60° C. However, lower dissolving temperature requires longer period of dissolution which leads to problems in commercial operation such as deterioration and decomposition of polyvinyl pyrrolidone, low productivity and larger production facilities.

The present inventors investigated the conditions required for dissolving at a low temperature in a short period of time, and found that it is preferable to mix and knead the components of the spinning solution before dissolution, thereby completing the present invention. The mixing and kneading operation may be carried out either by mixing and kneading all the components containing polysulfone-based polymer, polyvinyl pyrrolidone and the solvent together, or by mixing and kneading polysulfone-based polymer and polyvinyl pyrrolidone separately. As described previously, polyvinyl pyrrolidone deteriorates when exposed to oxygen, and generates hydrogen peroxide. Therefore, it is important to keep the material from contact with oxygen such as carrying out the mixing and kneading operation in an inert gas atmosphere, and it is preferable to carry out the operation in a separate line. It is also within the scope of the present invention to apply mixing and kneading only to polyvinyl pyrrolidone and the solvent, while charging the polysulfone-based polymer directly into the dissolution tank without mixing and kneading.

The mixing and kneading operation may also be carried out in a kneading line provided separately from the dissolution tank, with the mixture charged into the dissolution tank, or both the kneading and the dissolving operations may be carried out in a dissolution tank having the kneading function. There are no limitations on the kind and type of the kneader, either of batch operation or continuous operation, in the former case where the operations are carried out in separate pieces of equipment. Either a static process such as static mixer or a dynamic process such as kneader or a stirring mixer may be employed. From the view point of efficiency of mixing and kneading, the latter process is preferred. When a dynamic process is employed, there is no limitation on the method of mixing and kneading, and pin type, screw type, stirrer type, or other type may be used, while screw type is preferred. Type and rotating speed of the screw may also be set in consideration of the balance between efficiency of mixing and kneading and heat generation.

In case a dissolution tank having mixing and kneading function is used, there is no limitation on the type of the dissolution tank. It is recommended to use, for example, a dissolution kneader of such a type that improves the efficiency of mixing and kneading by the so-called planetary motion in which two frame type blades move around while spinning. For example, Planetarium Mixer and Trimix available from INOUE MFG., INC. belong to this type.

There is also no limitation on the proportions of the resin components such as polyvinyl pyrrolidone and polysulfone-based polymer and the solvent to be mixed. Ratio of resin to solvent by weight is preferably from 0.1 to 3 and more preferably from 0.5 to 2.

An important point of the present invention is to dissolve the material efficiently while suppressing polyvinyl pyrrolidone from deteriorating, as described previously. Accordingly, it is preferable that at least the system containing polyvinyl pyrrolidone is subjected to the mixing and kneading and the dissolving operations in nitrogen atmosphere at a low temperature of 70° C. or lower. In case polysulfone-based polymer and polyvinyl pyrrolidone are kneaded in separate lines, the method described above may be applied to the kneading line for polysulfone-based polymer. Efficiencies of kneading and dissolution and heat generation are tradeoffs. It is important for the present invention to select the equipment and operating conditions so as to avoid the tradeoff. With this respect, method of cooling the kneading mechanism is important and requires consideration.

The kneaded mixture as described above is again dissolved. While there is no limitation on the method of dissolving, for example, a stirring dissolving apparatus may be employed. In order to dissolve in a sort period of time (within 3 hours) at a low temperature, it is preferable that Froude number ($Fr=n^2d/g$) is within a range from 0.7 to 1.3 and Reynolds number ($Re=nd^2\rho/\mu$) of stirring is within a range from 50 to 250, where n is the number of revolutions per second (rps) of the vane, $\rho$ is density ($Kg/m^2$), $\mu$ is viscosity (Pa·s), g is acceleration of gravity ($=9.8 \ m/s^2$) and d is diameter (m) of stirring vane. When Froude number is too large, the inertia becomes too large and scattered material may stick onto the wall and top plate in the tank, thus resulting in the membrane forming solution different from the intended composition. Therefore, Froude number is more preferably 1.25 or less, still more preferably 1.2 or less, and even more preferably 1.15 or less. When Froude number is too small, the inertia becomes too small that the material cannot be dispersed sufficiently, and polyvinyl pyrrolidone may form lumps which cannot be dissolved or take a longer time to dissolve uniformly. Therefore, Froude number is more preferably 0.75 or higher and still more preferably 0.8 or higher.

Since the membrane forming solution of the present invention is a low viscosity liquid, if the Reynolds number is too large, such problems may occur as long time is taken in deaeration or insufficient deaeration due to air trapped into the membrane forming solution during stirring. Therefore, Reynolds number is more preferably 240 or less, still more preferably 230 or less, and even more preferably 220 or less. When the Reynolds number is too small, on the other hand, stirring force becomes too small to dissolve uniformly. Therefore, Reynolds number is more preferably 35 or larger, still more preferably 40 or larger, even more preferably 55 or larger, and particularly preferably 60 or larger. When the hollow fiber membrane is formed from such a spinning solution, it was found that air bubbles decreases the stinginess leading to lower productivity, and the product quality is also affected by the entrapping of air into the hollow fiber membrane which generates a defect in that location, lower air tightness of the membrane and lower burst pressure. Although deaeration of the spinning solution is effective in countering these problems, degassing should be carried out carefully since it may accompany a change in composition of the spinning solution due to viscosity control of the spinning solution or evaporation of the solvent.

Moreover, since polyvinyl pyrrolidone is susceptible to oxidization decomposition by the oxygen in the air, the spinning solution is preferably dissolved in an inert gas atmosphere. While nitrogen, argon or the like may be used as the inert gas, it is preferable to use nitrogen. At this time, concentration of oxygen remaining in the dissolving tank is preferably not higher than 3%. While the dissolving time can be reduced by increasing the pressure of sealing with nitrogen, increasing the pressure requires higher equipment cost and causes a concern about safety of operation. Thus the pressure of the inert gas is preferably not higher than 2 $kgf/cm^2$ above the atmospheric pressure.

The stirring vane used in the present invention may be any stirring vane used in the dissolution of low viscosity membrane forming solution, including radial flow vanes such as disk turbine type, paddle type, curved fan turbine type and feather type turbine, and axial flow type vanes such as propeller type, slanted paddle type and Foudler type, but is not limited to these.

By employing the method of low temperature dissolution, it is made possible to obtain the hollow fiber membrane having high safety where the hydrophilic polymer is suppressed from being deteriorated and decomposed. In addition, it is preferable to use a spinning solution of which retention time after dissolving the raw material is 24 hours or less, when forming the membrane. This is because it has been confirmed that the membrane forming solution accumulates thermal energy while being kept at a temperature, which leads to deterioration.

It is also preferable that the hollow fiber membrane is not put into absolute dry condition, in the consideration of amount of hydrogen peroxide elution and for suppressing the variation thereof. Under absolute dry condition, deterioration of polyvinyl pyrrolidone is accelerated so as to increase the generation of hydrogen peroxide. Absolute dry condition may also result in low wettability when the hollow fiber membrane is wetted again for use, or decrease the capability of polyvinyl pyrrolidone to absorb water thus making polyvinyl pyrrolidone more likely to elute out of the hollow fiber membrane. The water content of the dried hollow fiber membrane is preferably 0.5% by weight or more, more preferably 0.7% by weight or more, and still more preferably 1.0% by weight or more.

Also according to the present invention, it is preferable that polyvinyl pyrrolidone is not substantially crosslinked. When the separation membrane is used in a blood purifier, for example, it is sterilized by the irradiation of γ ray and the irradiated polyvinyl pyrrolidone tends to be crosslinked. According to the present invention, it is preferable to minimize the cross-linking reaction of polyvinyl pyrrolidone caused by the irradiation of γ ray. Cross-linking reaction of polyvinyl pyrrolidone is influenced by the water content of the hollow fiber membrane. When the water content exceeds 10% by weight, cross-linking reaction occurs markedly. Thus the water content is preferably 10% by weight or less, more preferably 7% by weight or less, and still more preferably 4% by weight or less.

With regard to the drying process, in the prior art, hollow fiber membrane bundle has been dried by sending air of 60° C. one way in the longitudinal direction of the hollow fiber membrane bundle for about 20 hours, as disclosed in Japanese Unexamined Patent Publication (Kokai) No. 2000-300663. With this method, however, the amount of hydrogen peroxide elution varied significantly in the longitudinal direction of the hollow fiber membrane bundle. The cause of this problem is not fully understood, but it is believed that, in case the hollow fiber membrane bundle is dried by sending air one way, the hollow fiber membrane bundle is dried progressively from the air inlet toward the outlet and therefore drying completes early near the inlet and later near the outlet. As a result, the hollow fiber membrane bundle is over dried near the air inlet and the material of the hollow fiber membrane bundle decomposes and deteriorates, resulting in accelerated oxidizing deterioration of the material constituting the hollow fiber membrane bundle, particularly polyvinyl pyrrolidone, near the air inlet. The present inventors dried the hollow fiber membrane bundle while changing the direction of blowing air by 180 degrees at predetermined time intervals (for example, 1 hour or 30 minutes), for the purpose of evenly drying the hollow fiber membrane bundle while avoiding localized over drying. The inventors also lowered the temperature in the drying chamber and the drying air temperature from 60° C. employed in the prior art to 40° C. for the purpose of suppressing the rate of oxidization reaction which is fed by the drying heat, thus obtaining the hollow fiber membrane bundle of the present invention. Since oxidizing deterioration is supposedly the cause of variation of the amount of hydrogen peroxide elution as described above, it is also effective to substitute the drying atmosphere with an inert gas such as nitrogen gas.

While the air flow rate and velocity in the drying chamber may be set according to the quantity of the hollow fiber membrane bundle and the total water content, air flow rate of about 0.01 to 5 L/sec per one hollow fiber membrane bundle is sufficient. An inert gas is preferably used as the drying medium. When air is used as the drying medium, it is preferably dehumidified.

Drying temperature may be from 20 to 80° C. A higher drying temperature may increase flaws on the hollow fiber membrane bundle and result in uneven drying. Therefore the drying temperature is preferably from the room temperature to about 60° C. at the maximum. When the water content is from 200 to 1000% by weight, for example, drying may be done at relatively high temperatures from 60 to 80° C. As the drying proceeds and the water content has dropped to a level of 1 to 50% by weight, it is preferable to dry at a relatively low drying temperature of room temperature to about 60° C. at the maximum.

Ideal drying operation is such that there remains no difference in water content not only between the central portion and the periphery of the hollow fiber membrane but also between the central portion and the periphery of the hollow fiber membrane bundle which is a collection of hollow fiber membranes which are bundled. Actually, however, there remains some difference in water content between the central portion and the periphery of the hollow fiber membrane and of the hollow fiber membrane bundle. Thus the "water content" in the hollow fiber membrane bundle used in this context means the "mean water content" from the values measured at several points such as center, intermediate position and peripheral portion. When high accuracy is not desired, mean water content may be determined from the total water content of the hollow fiber membrane bundle. Since it is a requirement for a product of high quality to have less difference in water content between the center, intermediate position and peripheral portion of the hollow fiber membrane bundle, attention is paid to the drying method that achieves such a quality. When an inert gas such as nitrogen gas or argon gas is used for the drying medium, the hydrophilic polymer is less likely to deteriorate and decompose since the drying proceeds in an atmosphere substantially free from oxygen, and therefore drying temperature can be set higher.

Gas flow rate and drying temperature may be determined in accordance to the total water content in the hollow fiber membrane bundle. When the water content is high, gas flow rate is set relatively high, for example from 0.1 to 5 L/sec per one hollow fiber membrane bundle, and the temperature may also be set relatively high, for example from 50 to 80° C. As the drying proceeds and the water content in the hollow fiber membrane bundle has lowered, gas flow rate may be decreased gradually, for example to 0.1 L/sec per one hollow fiber membrane bundle or lower, while gradually lowering the drying temperature to the room temperature accordingly.

In order to decrease the difference in water content between the center, the intermediate position and the peripheral portion of the hollow fiber membrane bundle, it can be effective to cause drying to proceed simultaneously at different portions in a uniform manner. For this purpose, such a method may be preferably employed as the direction of blowing the drying gas is changed alternately, namely the direction of blowing the gas to the hollow fiber membrane bundle is alternately changed by 180 degrees. Changing the blowing direction may also be done by an apparatus designed to change the direction of the hollow fiber membrane bundle alternately by 180 degrees. Changing the blowing direction may also be done by a gas blowing apparatus designed to change the blowing direction alternately by 180 degrees while holding the hollow fiber membrane bundle stationary. There is no limitation on the means of blowing gas. In the case of a circulation type blow dryer, in particular, the apparatus that changes the direction of the hollow fiber membrane bundle alternately by 180 degrees is not designed well but also functions rationally in operation. It was found that this drying method that involves the commonplace direction switching has unexpected effect, which cannot be seen in the operation of drying general purpose materials, in the embodiment of the present invention, particularly in the quality control for preventing the partial sticking of such a special material as the hollow fiber membrane bundle.

The period of time between the changes of blowing direction for drying may be set in accordance to such factors as the total water content in the hollow fiber membrane bundle to be dried, blowing gas velocity, flow rate, drying temperature and the degree of dehumidizing the air. In order to dry uniformly, it is preferable to change the blowing direction frequently. The period of time between the changes of blowing direction also affects the water content after the start of drying. For example, in a drying sequence comprising 1 to 4 hours of drying at a high temperature from 60 to 80° C. (for example, 65° C.) and 1 to 20 hours of drying at a temperature from 25 to 60° C. (for example, about 30° C.), without total drying time of about 24 hours, blowing direction may be changed mechanically at intervals of 30 to 60 minutes.

In the case of drying with a relatively high flow rate of 0.1 to 5 L/sec at a high temperature from 60 to 80° C. in the early stage of drying when the total water content is high, for example, blowing direction may be changed at time intervals of 10 to 120 minutes for a period of 1 to 5 hours since the portion first hit by the flow of gas is dried faster. In the first stage, in particular, it is preferable to change the blowing direction at time intervals of 10 to 40 minutes. As the difference in water content between the center and the periphery of the hollow fiber membrane bundle decreases, drying temperature may be gradually lowered to near the room temperature of about 30° C., while changing the blowing direction at time intervals of 30 to 90 minutes. The blowing flow rate and the temperature may be changed freely while taking the water content of the hollow fiber membrane bundle into consideration. Specifically, in quantitative terms, drying temperature and the timing of changing the blowing direction may be changed while observing the progress of drying, when the water content determined from those in the center and the periphery of the hollow fiber membrane bundle has fallen within a range from 50 to 100% by weight.

Drying may be carried out by setting the timing of changing the blowing direction mechanically at fixed time intervals. There are also factors which are determined relying on the observation of the condition and on the experience such that the timing of changing the blowing direction and the total drying time are determined while observing the progress of drying. Total water content (% by weight) in the present invention can be easily determined by measuring the weight (a) of the hollow fiber membrane bundle before drying and the weight (b) of the hollow fiber membrane bundle after drying and calculating as follows:

Water content (% by weight)=$(a-b)/b \times 100$

Irradiation with microwave under reduced pressure is also an effective means of drying. With this method, it is preferable to irradiate with microwave of output power within a range from 0.1 to 100 kW under a reduced pressure of 20 kPa or lower. It is also preferable that frequency of the microwave is from 1,000 to 5,000 MHz, and the maximum attainable temperature of the hollow fiber membrane bundle during the drying process is 90° C. or lower. Since evaporation of water can be accelerated simply by reducing the pressure, output power of the microwave may be set lower and the duration of irradiation can be shortened. Moreover, temperature can be kept relatively low so as to minimize the influence of the high temperature on the performance of the hollow fiber membrane bundle. Drying under a reduced pressure also has such an advantage as deterioration and decomposition of the hydrophilic polymer can be significantly suppressed since the drying temperature can be lowered. Thus drying temperature is preferably from 20 to 80° C., more preferably from 20 to 60° C., still more preferably from 20 to 50° C., and even more preferably from 30 to 40° C.

Reduced pressure means that uniformly decreased pressure is applied to the center and the periphery of the hollow fiber membrane bundle so that evaporation of water is accelerated evenly and the hollow fiber membrane is dried evenly. As a result, troubles of the hollow fiber membrane bundle caused by uneven drying can be prevented from occurring. Heating by the irradiation of microwave can also achieve peculiar effects in drying the hollow fiber membrane bundle, since the microwave exerts the effects substantially evenly on the center and the entire periphery of the hollow fiber membrane bundle, so that combined effects of uniform drying and reduced pressure can be achieved. The degree of pressure reduction can be determined in accordance to the output power of microwave, total water content in the hollow fiber membrane bundle, and the number of hollow fiber membrane bundle. In order to suppress the temperature of the hollow fiber membrane bundle from being rising while being dried, the degree of pressure reduction is preferably 20 kPa or lower, more preferably 15 kPa or lower, and still more preferably 10 kPa or lower. The higher the degree of pressure reduction, the lower the efficiency of water evaporation becomes with higher possibility of deterioration as the temperature of the polymer that constitutes the hollow fiber membrane bundle becomes higher. While the degree of pressure reduction is preferably lower in order to suppress the temperature from rising and achieve higher efficiency of drying, it also leads to higher cost of maintaining the air-tightness of the equipment. Therefore, the degree of pressure reduction is preferably 0.1 kPa or higher, more preferably 0.25 kPa or higher, and still more preferably 0.4 kPa or higher.

The output power of microwave is preferably higher in order to reduce the drying time. However, in the hollow fiber membrane bundle that contains polyvinyl pyrrolidone, for example, a high output power may cause such problems as deterioration and decomposition of polyvinyl pyrrolidone due to over drying and/or overheating, and lower wettability during use. Thus the output power should not be set too high. While the hollow fiber membrane bundle can be dried with an output power of less than 0.1 kW, it may lead to longer drying time which means lower processing capacity. Optimum combination of the degree of pressure reduction and the output power of microwave can be determined in accordance to the water content in the hollow fiber membrane bundle and the number of hollow fiber membrane bundle to be treated.

Drying conditions that satisfy the requirements of the present invention are preferably 1.5 kW for the output power of microwave and 5 kPa for the degree of pressure reduction for the total water content of 1,000 g (50 g×20 pieces), for example, in the case of drying 20 hollow fiber membrane bundles that contain 50 g of water content per piece.

The output power of microwave is more preferably from 0.1 to 80 kW, and still more preferably from 0.1 to 60 kW. The output power of microwave is determined from, for example, the total number of hollow fiber membranes and the total water content. When microwave of high output power is suddenly applied, however, drying can be completed in a short time but the hollow fiber membrane may be partially denatured and deformation such as wrinkling may be caused. In case the hollow fiber membrane contains a water retaining agent or the like, for example, rapid drying with microwave of high output power may cause the water retaining agent to be scattered and lost. In the prior art, it has not been intended to irradiate with microwave under a reduced pressure. In the present invention, as the irradiation with microwave under a reduced pressure accelerates the evaporation of aqueous liquid even at a relatively low temperature, dual effects of preventing the deterioration of polyvinyl pyrrolidone due to the microwave of high output power and high temperature, and preventing damage such as deformation of the hollow fiber membrane can be achieved.

According to the present invention, drying by the irradiation with microwave under a reduced pressure is not limited to single-stage drying operation with constant output power of microwave. In another preferred embodiment, multi-stage drying operation may be employed wherein the output power of microwave is decreased stepwise as the drying proceeds. The multi-stage drying operation will be described below.

In the case of drying by means of microwave under a reduced pressure and at a relatively low temperature from 30 to 90° C., the multi-stage drying operation wherein the output power of microwave is gradually decreased in accordance to the progress of the drying operation can be an excellent method. The degree of pressure reduction, temperature, the output power of microwave and the duration of irradiation may be determined by taking the total quantity of hollow fiber membrane to be dried and the length of drying time that is commercially acceptable into consideration.

The multi-stage drying operation may be carried out with any number of stages such as 2 to 6, proper number of stages is from 2 to 4 when the productivity of commercial operation is taken into consideration. When the hollow fiber membrane bundle includes a relatively large amount of total water content, the multi-stage drying sequence can be determined by taking the duration of microwave irradiation into consideration such as the output power from 30 to 100 kW in the first stage, from 10 to 30 kW in the second stage and from 0.1 to 10 kW in the first stage under reduced pressure of 5 to 20 kPa at a temperature of 90° C. or lower. When a great difference in the output power of microwave is involved, such as 90 kW in a stage of high output and 0.1 kW in a stage of low output, the output power may be decreased through a larger number of stages, such as 4 to 8. According to the present invention, multi-stage drying operation is advantageous since it enables it to dry even with a low output power of microwave, since reduction of pressure and microwave irradiation can be combined. Such a sequence may be employed as irradiation of microwave of 10 to 20 kW for 10 to 100 minutes in the first stage, 3 to 10 kW for 5 to 80 minutes in the second stage, and 0.1 to 3 kW for 1 to 60 minutes in the third stage. The output power of microwave and irradiation time are preferably gradually decreased in accordance to the decrease in the total water content in the hollow fiber membrane. This drying method is very mild to the hollow fiber membrane bundle, which cannot be expected from the prior art technologies of patent Japanese Unexamined Patent Publication (Kokai) No. 2003-175320, Japanese Unexamined Patent Publication (Kokai) No. 2003-175321 and Japanese Unexamined Patent Publication (Kokai) No. 2003-175322.

When the hollow fiber membrane bundle includes a relatively low total water content, for example not higher than 400% by weight, irradiation with a low output power of microwave not higher than 12 kW may have excellent effect. For example, in case the hollow fiber membrane bundle includes a relatively low total water content of about 1 to 7 kg, for example, after heating the hollow fiber membrane bundle uniformly with microwave having output power of not higher than 12 kW, for example 1 to 5 kW, for 1 to 240 minutes under reduced pressure of 3 to 10 kPa at a temperature not higher than 80° C., preferably not higher than 60° C., the microwave irradiation is stopped and, at the same time, the degree of pressure reduction is increased to a level of 1 to 3 kPa, so that water content can be evaporated. When temperature of the hollow fiber membrane bundle has decreased to such a level that makes it difficult to evaporate water content, the degree of pressure reduction is returned to a level of 3 to 10 kPa, microwave irradiation is resumed and the hollow fiber membrane bundle can be heated with microwave of output power of 0.5 kW or higher and less than 1 kW for 10 to 240 minutes. When the temperature of the hollow fiber membrane bundle has become high, the microwave irradiation is stopped and the degree of pressure reduction is decreased to a level of 0.5 to 1.5 kPa, so that water content can be evaporated. When it becomes difficult to evaporate water content, the degree of pressure reduction is increased again to a level of 3 to 10 kPa, and the hollow fiber membrane bundle can be heated with microwave of output power of 0.1 kW or higher and less than 0.5 kW for 1 to 240 minutes. Thus uniform drying can be carried out by controlling the output power and duration of microwave irradiation in accordance to the progress of drying. While the degree of pressure reduction can be conveniently set within a range from 0.1 to 20 kPa for each stage, the degree of pressure reduction can be properly set in response to the decreasing values of total water content and water content of the hollow fiber membrane bundle. For example, such a sequence may be employed as the degree of pressure reduction is set higher (for example, 0.1 to 5 kPa) and the output power of microwave irradiation is set higher (for example, 10 to 30 kW) in the first stage where the hollow fiber membrane has a relatively high water content, and microwave is irradiated under a somewhat higher pressure (for example, output power of 0.1 to 5 kW with pressure reduction of 5 to 20 kPa) for the second third stages. The operation of changing the degree of pressure reduction in each stage can make the features of the present invention that microwave is applied under a reduced pressure even more meaningful. It goes without saying that paying attention always to uniform irradiation of microwave and ventilation in the microwave irradiating apparatus is important.

It is also effective to combine the drying method employing microwave irradiation under a reduced pressure and the drying method employing drying gas of which blowing direction is changed alternately, for drying the hollow fiber membrane bundle of the present invention, although it makes the process more complicated. The microwave irradiation method and the alternately changed blowing direction method have their own merit and demerit, and can be used together to achieve high quality. The alternately changed blowing direction method may be employed in the first stage of drying, then switching to the microwave irradiation under a reduced pressure when the mean water content has dropped to a level of 20 to 60% by weight. In this case, drying by microwave irradiation may be carried out followed by the alternately changed blowing direction method. The mode of combining the two methods may be determined by taking into consideration the quality of the hollow fiber membrane to be obtained by drying, particularly the quality of the polysulfone-based permselective hollow fiber membrane bundle that is free from partial sticking of the hollow fiber membrane in the longitudinal direction. While the two drying methods may be carried out simultaneously, it has such disadvantages as complicated equipment and higher manufacturing cost, and is not practically favorable. Meanwhile use of far infrared ray or other effective heating method may also be combined in the drying method of the present invention.

The highest temperature of the hollow fiber membrane bundle achieved during drying can be measured by attaching an irreversible thermo-label and checking the indication after drying. The highest temperature of the hollow fiber membrane bundle achieved during drying is preferably 90° C. or lower, more preferably 80° C. or lower, and still more preferably 70° C. or lower. When the highest temperature of the hollow fiber membrane bundle is too high, the membrane structure tends to change and decrease in the performance or deterioration by oxidization may result. In the case of hollow fiber membrane bundle which contains polyvinyl pyrrolidone, in particular, it is important to suppress the temperature from rising since polyvinyl pyrrolidone is susceptible to thermal decomposition. For the purpose of suppressing the temperature from rising, it is effective to optimize the degree of pressure reduction and the output power of microwave and apply the irradiation intermittently. While the drying temperature is preferably lower, it is preferably 30° C. or higher when the cost of keeping the degree of pressure reduction and the requirement to shorten the drying time are taken into consideration.

Frequency of the microwave is preferably from 1,000 to 5,000 MHz in order to suppress irradiation spots from developing in the hollow fiber membrane bundle and achieve the effect of purging water from the pores. The frequency is more preferably from 1,500 to 4,000 MHz, and still more preferably from 2,000 to 3,000 MHz.

When drying by microwave irradiation, it is important to uniformly heat and dry the hollow fiber membrane bundle. When drying by microwave irradiation, it is important to take measures for avoiding uneven heating by reflected microwave since microwave irradiation is accompanied by reflection which causes uneven heating. While there is no limitation on the measures, the method of equalizing the heating by reflecting the reflected microwave by means of a reflector installed in an oven disclosed in Japanese Unexamined Patent Publication (Kokai) No. 2000-340356 may be preferably employed.

Major constitution of the present invention and key points to be taken into consideration when embodying the present invention have been described. The spinning process and the post treatment process to obtain the separation membrane of the present invention will now be described in detail by way of examples.

For the membrane forming solution, polymer, a solvent and, as required, a nonsolvent are used. For the internal liquid, it is preferable to use a mixture liquid which contains the same solvent as that used in the membrane forming solution and water, but nonsolvent may be added as required to obtain the desired performance and property of the membrane. With regards to polysulfone-based polymer, not only polysulfone and polyethersulfone but also a mixture of two or more of the polymers may be used. The solvent is preferably such that can dissolve both polysulfone-based polymer and polyvinyl pyrrolidone. Specifically, dimethylacetamide, dimethylsulfoxide, N-methyl-2-pyrrolidone, dimethylformamide or the like may be used. Dimethylacetamide and N-methyl-2-pyrrolidone are preferably used. The nonsolvent in the present invention refers to a substance which can be mixed with the solvent in a certain range of proportions but is not capable of dissolving polysulfone-based polymer. For example, water, ethylene glycol, triethylene glycol, polyethylene glycol, propylene glycol, polypropylene glycol, 1,3-butylene glycol, glycerin, diethylene glycol monoethyl ether and diethylene glycol monobutyl ether are preferably used. Water, triethylene glycol or polyethylene glycol is preferably used in view of safety of operation, availability and cost.

The membrane forming solution is discharged from a double-tube nozzle of tube-in-orifice type nozzle heated to a temperature from room temperature to 130° C., so as to form the membrane by the dry-wet spinning method. The internal liquid for solidifying the membrane forming solution is discharged into the air from the nozzle simultaneously with the membrane forming solution, flies through the air which is shut off from the atmosphere so as to be introduced into a solidification bath disposed right below the nozzle and form the membrane through microscopic phase separation. The hollow fiber membrane thus obtained is passed through a water bath so as to remove excessive solvent, nonsolvent and polyvinyl pyrrolidone from the membrane. A predetermined number of hollow fiber membranes are wound around a skein, inserted into a film that protects the hollow fiber membrane bundle and cut to a predetermined length. After removing the internal liquid by centrifugal separation, the hollow fiber membrane bundle is washed again so as to remove excessive polyvinyl pyrrolidone and decomposition products and control the concentrations of substances contained in the membrane. The hollow fiber membrane thus obtained is dried at a low temperature.

The width of the membrane forming solution discharge orifice of the nozzle is preferably 100 μm or less as described previously. The width is more preferably 80 μm or less, and still more preferably 60 μm or less. While the discharge orifice width is preferably smaller for the purpose of making the membrane thinner, making the orifice too small leads to such problems as clogging of the nozzle and difficulty of cleaning. Therefore the discharge orifice width is preferably 20 μm or larger, and more preferably 30 μm or larger. The ratio L/D of the outer diameter (D) of the membrane forming solution discharge passage and the land length (L) is preferably from 2 to 6. This enables it to achieve favorable orientation of polyvinyl pyrrolidone on the inner surface of the hollow fiber membrane.

In the present invention, as described previously, it is important to control the content of polyvinyl pyrrolidone on the outer surface of the hollow fiber membrane within a particular range, in order to prevent the elution of polyvinyl pyrrolidone and the infiltration of endotoxin into the blood side and achieve well-balanced effects such as preventing the hollow fiber membranes from sticking each other when drying the hollow fiber membrane. For this purpose, such measures may be employed as controlling the proportion of the polyvinyl pyrrolidone content to polysulfone-based polymer content in a predetermined range and optimizing the conditions of forming the hollow fiber membrane. It is also effective to clean the hollow fiber membrane that has been formed. With regards to membrane forming conditions, it is effective to optimize drawing conditions, temperature of the solidification bath and proportions of the solvent and the nonsolvent contained in the solidification liquid. With regards to the cleaning method, it is effective to employ cleaning in warm water, cleaning with alcohol, centrifugal cleaning or the like.

When producing the hollow fiber membrane of the present invention, it is preferable that drawing is not substantially applied before the hollow fiber membrane structure is completely fixed. The phrase "drawing is not substantially applied" means that the membrane forming solution discharged from the nozzle is not excessively slacked or tensioned. For this purpose, for example, rotating speed of the roller in the spinning process is controlled. The ratio of the linear velocity of discharge to the first roller speed in the solidification bath (draft ratio) is preferably within a range from 0.7 to 2.0. When the draft ratio is too low, the running hollow fiber membrane may be slackened resulting in lower productivity. Therefore, draft ratio is more preferably 0.8 or higher, still more preferably 0.9 or higher and even more preferably 0.95 or higher. When the draft ratio is too high, the membrane structure may be destroyed such as tearing of the dense layer of the hollow fiber membrane. Therefore, a draft ratio is more preferably 1.9 or less, and still more preferably 1.8 or less. By controlling the draft ratio in this range, it is made possible to prevent the pores from deforming or breaking, prevent the blood protein from clogging the membrane holes and achieve stability of performance with time and sharp demarcation characteristic. Also in combination with the effect of the optimization of the internal liquid temperature, it makes it possible to form microscopic streaks of surface unevenness on the inner surface in the longitudinal direction of the hollow fiber membrane, thereby increasing the adsorption of $\alpha 1$-microglobulin.

The hollow fiber membrane which has passed the water bath is wound around a skein in the wet state, so as to form bundles of 3,000 to 20,000 pieces. The hollow fiber membranes thus obtained are washed to remove excessive solvent and polyvinyl pyrrolidone. The hollow fiber membranes are preferably cleaned by immersing the hollow fiber membrane in hot water of 70 to 130° C., 10 to 40 vol % ethanol of room temperature to 50° C., or aqueous solution of isopropanol.

(1) When cleaning in hot water, the hollow fiber membranes are immersed in excess RO water of temperature from 70 to 90° C. for 15 to 60 minutes, then subjecting the hollow fiber membrane that are taken out of the water to centrifugal dewatering. This operation is repeated 3 or 4 times each time renewing the RO water.

(2) The hollow fiber membrane may also be immersed in excess RO water contained in a pressure vessel kept at 121° C. for about 2 hours.

(3) The same operation as that of (1) is preferably repeated also when using ethanol or aqueous solution of isopropanol.

(4) It is a preferable cleaning method to dispose the hollow fiber membranes radially in a centrifugal cleaning apparatus and apply centrifugal cleaning for 30 minutes to 5 hours while showering cleaning water of a temperature from 40 to 90° C. supplied from the center of rotation.

Two or more of the cleaning methods described above may be combined. With any of these methods, setting the processing temperature too low may make it necessary to increase the number of cleaning operations which results in higher cost. When the processing temperature is set too high, on the other hand, decomposition of polyvinyl pyrrolidone may be accelerated leading to lower efficiency of cleaning. Cleaning as described above enables it to achieve a proper content of polyvinyl pyrrolidone on the outer surface, suppress sticking and decrease the amount of elution.

According to the present invention, when the hollow fiber membrane is stored in dry condition, it is preferable to keep the storage temperature to 20° C. or lower in order to suppress hydrogen peroxide from being generated. It is also preferable to store the hollow fiber membrane in a sealed package from which oxygen has been purged. For example, the hollow fiber membrane may be put into a bag constituted from an outer layer made of polyester film, and intermediate layer made of aluminum foil and an inner layer made of polyethylene film which substantially shuts off oxygen and water vapor while insulating heat, and is sealed after substituting the air inside with an inert gas or has a deoxidant put therein. In this case, the hollow fiber membrane is preferably stored in such a state as water content is from 1% by weight to saturation water content. The water content is more preferably from 1 to 10% by weight, and still more preferably from 1 to 7% by weight. In case water content of the hollow fiber membrane is less than 1% by weight, atmosphere in the storage bag is preferably kept at a relative humidity of 50% at room temperature, or put a deoxidant which releases moisture therein.

In case irradiation of $\gamma$ ray or electron beam is used for sterilization in the present invention, it is preferable to dry the hollow fiber membrane bundle before sterilization in order to suppress crosslinking reaction of polyvinyl pyrrolidone from taking place. In order to suppress the generation of hydrogen peroxide due to the deterioration of polyvinyl pyrrolidone by the irradiation of $\gamma$ ray or electron beam, it is preferable to employ a method similar to the storage method described above.

The permselective separation membrane and the blood purifier of the present invention are capable of minimizing the leakage of albumin which is a useful protein, and removing other proteins of low molecular weights. Leakage of albumin from the permselective separation membrane used in the blood purifier is preferably 3 g/3 L or less. Clearance of $\alpha 1$-microglobulin is preferably 15 ml/m$^2$ or more. When the $\alpha 1$-microglobulin removal rate becomes lower, the effects of preventing dialysis complications and mitigating the symptoms of itching and pain may not be achieved. Preventing the albumin from leaking and removing the $\alpha 1$-microglobulin may be tradeoffs since both substances have proximate molecular weights. With the prior art technology, controlling the albumin leakage within the range described above leads to lower $\alpha 1$-microglobulin removal ratio. When the $\alpha 1$-microglobulin removal ratio is set within the range described above, it becomes impossible to achieve albumin leakage ratio not higher than 3 g/3 L. The most important feature of the present invention is achieving both requirements related to the prevention of albumin leakage and removal of $\alpha 1$-microglobulin at the same time, which cannot be achieved by the prior art technology. According to the present invention, as the means for improving the $\alpha 1$-microglobulin removal ratio, a measure of adsorbing $\alpha 1$-microglobulin onto the surface of the permselective separation membrane is added along with a measure of improving the permeability of $\alpha 1$-microglobulin, thereby achieving the high removal ratio by the combined effects, which is one of the key points of solving the problems of tradeoff.

In addition, the permselective separation membrane of the present invention may have many desired characteristics desirable for the use in a blood purifier as follows, in addition to the features described above.

(1) Balancing of the amount of elution of polyvinyl pyrrolidone and the compatibility with blood
(2) Suppressing the permeability of endotoxin
(3) Decreasing the blood retention
(4) Mitigation of priming property
(5) Suppressing the permselective separation membranes from sticking each other for smooth assembly of module
(6) Increasing the burst pressure for higher reliability
(7) Ensuring stability of long-term storage of permselective separation membrane Therefore, the permselective separation membrane of the present invention has very high quality for the use in blood purifier, and can be used preferably in blood purification.

EXAMPLES

Validity of the present invention will now be described by way of examples, but the present invention is not limited to these examples. In the examples, physical properties were evaluated by the following procedures.

1. Sieving Coefficient of Albumin

In the case of hollow fiber membrane bundle, a hollow fiber membrane module comprising the hollow fiber membrane bundle packed in a module casing which was sealed on both ends with urethane resin with an aperture cut was used in measurement. The sample may or may not be sterilized with γ ray.

(Preparation of 1% Bovine Plasma Albumin Solution)
Solution A: 53.72 g of $Na_2HPO_4 \cdot 12H_2O$ and 26.30 g of NaCl were dissolved in 3 L of pure water.
Solution B: 20.42 g of $KH_2PO_4$ and 26.30 g of NaCl were dissolved in 3 L of pure water.

A solution B was added to a solution A, and pH value was controlled to 7.5±0.1. 30 g of bovine plasma albumin (manufactured by Wako Pure Chemical Industries, Ltd.) was dissolved into 3 L of the phosphate buffer. After dissolving, pH value was controlled to 7.5±0.1 again with 1N-NaOH.

(Preparation of Module)
500 mL/min of pure water was flowed through the dialysis liquid-side passage of the module for 5 minutes, then 200 mL/min of pure water was flowed through the blood-side passage for 5 minutes. Next the phosphate buffer was flowed through the dialysis liquid-side passage of the module at a flow rate of 500 mL/min for 5 minutes, and then the phosphate buffer was flowed through the blood-side passage at a rate of 200 mL/min for 5 minutes, before flowing from the blood-side to the dialysis solution side while applying filtration for 3 minutes.

(Measurement)
The circuit was connected to the blood side, and the priming liquid on the dialysis liquid side (phosphate buffer) was discarded. The module was placed in a thermostat controlled at 37° C. and, after flowing liquid at a rate of 200 mL/min on the blood side with the dialysis liquid side being sealed, the priming liquid remaining on the blood side was discarded. Then the circuit was connected to the dialysis liquid inlet, flow rate on the blood side was set to 200 mL/min, flow rate in the filtration circuit connected to the dialysis liquid inlet was set to 30 mL/min, and test was conducted in the circulating system in which both the liquid passing the blood side and the filtrate were returned to the test liquid. 15 minutes after the start of circulation, both the liquid passing the blood side and the filtrate were sampled. The sample was diluted 10 times in volume (filtrate is preferably not diluted), and light absorptivity at wavelength of 280 nm was measured with a spectrometer. The sieving coefficient of albumin was calculated from the absorptivity as follows.

$$SCalb = 2 \times Cf/(Cb+Co)$$

where Cf is the absorbance of the filtrate, Cb is the absorbance of the test liquid and Co is the absorbance of the liquid passing the blood side. When diluted, the value is multiplied by the dilution factor.

2. Clearance of α1-Microglobulin

Human α1-microglobulin (catalog #133007 manufactured by COSMO BIO CO., LTD.) was dissolved in bovine blood (sodium citrate was added and adjusted to hematocrit 30% and total protein concentration of 6 to 7 g/dl), and the concentration of the solution was controlled to 100 mL/L. The bovine blood heated to 37° C. was sent by a small pump at a flow rate of 10 ml/min into the blood side of the module (inside of hollow fiber) having an area of 1.0 m² on the inner diameter basis. On the dialysis liquid side, dialysis solution heated to 37° C. was similarly flowed at a flow rate of 25 ml/min in the direction opposite to that of blood side. Flow rate at the outlet of the blood side was maintained at 10 ml/min. 30 minutes after setting the flow rates, samples were taken at the inlet and the outlet of blood side, and the outlet of the dialysis solution side. Concentration of α1MG was measured by the ELISA method and clearance CL was calculated as follows.

$$CL = (Cbi - Cbout)/Cbi \times Qb$$

where CL: Clearance (ml/min)
Cbi: Concentration at inlet of blood side
Cbout: Concentration at outlet of blood side
Qb: Blood flow rate (ml/min)

3. Measurement of α1-Microglobulin Adsorption

In the case of hollow fiber membrane bundle, a hollow fiber membrane module comprising the hollow fiber membrane bundle packed in a module casing which was sealed on both ends with urethane resin with apertures cut in both end faces was used in measurement. The sample may or may not be sterilized with γ ray.

(Preparation of 100 mg/L Solution of α1-Microglobulin)
Solution A 53.72 g of $Na_2HPO_4 \cdot 12H_2O$ and 26.30 g of NaCl were dissolved in 3 L of pure water.
Solution B: 20.42 g of $KH_2PO_4$ and 26.30 g of NaCl were dissolved in 3 L of pure water.

A solution B was added to a solution A, and pH value was controlled to 7.5±0.1. 300 mg of bovine plasma albumin (manufactured by Wako Pure Chemical Industries, Ltd.) was dissolved into 3 L of the phosphate buffer. After dissolving, pH value was controlled to 7.5±0.1 again with 1N-NaOH.

(Preparation of Module)
Pure water was flowed through the dialysis liquid-side passage of the module at a rate of 500 mL/min for 5 minutes, then pure water was flowed through the blood-side passage at a rate of 200 mL/min for 5 minutes. Next the phosphate buffer was flowed through the dialysis liquid-side passage of the module at a rate of 500 mL/min for 5 minutes, and then the phosphate buffer was flowed through the blood-side passage at a rate of 200 mL/min for 5 minutes, before flowing from the blood-side to the dialysis solution side while applying filtration for 3 minutes.

(Measurement)
The measurement circuit was connected to the blood side, and the priming liquid on the dialysis liquid side (phosphate buffer) was discarded. The module was placed in a thermostat controlled at 37° C. and, after flowing liquid at a rate of 200 mL/min for one minute on the blood side with the dialysis liquid side being sealed, the priming liquid remaining on the blood side was discarded. Then the circuit was connected to the dialysis liquid inlet, flow rate on the blood side was set to 200 mL/min, flow rate in the filtration circuit connected to the dialysis liquid inlet was set to 30 mL/min, and test was conducted in the circulating system in which both the liquid passing the blood side and the filtrate were returned to the test liquid. Test liquid was sampled at the start of circulation and at 15 minutes after the start of circulation. Concentration was measured by the ELISA method and the amount of adsorption was calculated as follows.

The amount of α1-microglobulin adsorbed (mg) = $Cb0 \times$ Quantity of test liquid $- Cb15 \times$ Quantity of test liquid where Cb0 and Cb15 are concentrations at the start of circulation and at 15 minutes after. When diluted, the value is multiplied by the dilution factor.

4. Water Permeability

Flow was stopped with a clamp at the blood outlet of the dialyzer (downstream of the pressure measuring point) to the effect of total filtration. Pure water controlled at a temperature of 37° C. was poured into a pressure tank and the pure water was sent to a dialyzer that was held at 37° C. by a thermostat, while controlling the pressure by means of a regulator. The filtrate flowing out of the dialysis solution side was measured with a measuring cylinder. Inter-membrane pressure (TMP) is defined as follows.

$$TMP=(Pi+Po)/2$$

where Pi is the pressure at the inlet of dialyzer and Po is the pressure at the outlet of dialyzer. Filtration flow rate was measured while changing TMP at 4 points, and the gradients in their relations were used to calculate the water permeability (mL/hr/mmHg). Correlation coefficient between TMP and the filtration flow rate must be 0.999 or higher. For the purpose of minimizing the error caused by the pressure loss in the circuit, TMP was measured in a range within 100 mmHg. Water permeability of the hollow fiber membrane was calculated from the surface area of the membrane and the water permeability of the dialyzer.

$$UFR(H)=UFR(D)/A$$

where UFR(H) is water permeability of the hollow fiber membrane (mL/m$^2$/hr/mmHg), UFR(D) is water permeability of the dialyzer (mL/hr/mmHg), and A is the membrane area of the dialyzer (m$^2$).

5. Calculating the Area of Membrane

Surface are of the membrane of the dialyzer was determined on the basis of internal diameter of the hollow fiber.

$$A=n \times \pi \times d \times L$$

where n is the number of hollow fibers in the dialyzer, π is the circular constant, d is the inner diameter (m) of the hollow fiber and L is the effective length (m) of the hollow fibers in the dialyzer.

6. Burst Pressure

A module packed with about 10,000 hollow fiber membranes was filled with water on the dialysis solution side thereof, and was plugged. Dry air or nitrogen gas at room temperature was introduced from the blood side while increasing the pressure at a rate of 0.5 MPa per minute. The pressure at which the hollow fiber membrane burst resulting in bubbles generated in the liquid filling the dialysis solution side was taken as the burst pressure.

7. Thickness Deviation

Cross sections of 100 hollow fiber membranes were observed with a projector of 200 times magnifying power. Thickness was measured at the thickest portion and the thinnest portion in the cross section of a hollow fiber which showed the largest difference in membrane thickness in one field of view.

Thickness deviation=Smallest thickness/Largest thickness

Thickness deviation of 1 means that the membrane thickness is completely uniform.

8. Blood Leakage Test

Bovine blood at a temperature of 37° C. with citric acid added to suppress coagulation was sent into a blood purifier at a flow rate of 200 mL/min, so as to filtrate the blood at a flow rate of 20 mL/min. The filtrate was returned into the blood, thereby constituting a circulating system. 60 minutes later, filtrate was sampled from the blood purifier and visual observation was conducted to check for red color caused by the leakage of red blood cells. The blood leakage test was conducted using 30 blood purifiers for each of examples and comparative examples, to determine the number of modules where leakage occurred.

9. Content of Hydrophilic Polymer on the Surface Layers on the Inside and Outside of Hollow Fiber Membrane Content of Hydrophilic Polymer Such as Polyvinyl Pyrrolidone (PVP) was Determined by X Ray Photoelectron Spectroscopy (ESCA).

ESCA measurement was conducted on one hollow fiber membrane attached onto a sample stage, under the following conditions.

Measuring instrument: ULVAC-PHI ESCA5800
Excitation X ray: Kα line of Mg
X ray output power: 14 kV, 25 mA
Escape angle of photoelectron: 45°
Analysis diameter: 400 μm
Pass energy: 29.35 eV
Resolution: 0.125 eV/step
Degree of vacuum: about 10$^{-7}$ Pa or lower PVP content on the surface was calculated as follows from the measurement of nitrogen (N) and measurement of sulfur (S)

<In the Case of PVP-Added PES (Polyethersulfone) Membrane>

Content (%) of $PVP(Hpvp)=100\times(N\times 111)/(N\times 111+S\times 232)$

<In the Case of PVP-Added PSf (Polysulfone) Membrane>

Content (%) of $PVP(Hpvp)=100\times(N\times 111)/(N\times 111+S\times 442)$

10. Measurement of PVP Content Throughout the Hollow Fiber Membrane

Samples were dried at 80° C. in a vacuum dryer for 48 hours, and 10 mg taken therefrom was analyzed with CHN coder (Model MT-6 manufactured by Yanaco Analytical Instruments Corp.), thereby determining the PVP content from the nitrogen content with the following formula.

PVP content (% by weight)=Nitrogen content (% by weight)×111/14

11. PVP Content in the Layer Near the Surface of Blood Contacting Surface of Hollow Fiber Membrane A Fourier transform infrared spectrophotometer (IRμs/SIRM manufactured by SPECTRA TECH Corp.) was used in measurement conducted according to ATR (attenuated total reflection method). Infrared absorption spectrum was measured using diamond 45° as internal reflection element on samples prepared in the same manner as in the method described in paragraph 9.

A ratio Ap/As of the peak absorption intensity Ap due to C=O bond in PVP around 1675 cm$^{-1}$ in the infrared absorption spectrum and the peak absorption intensity As due to polysulfone-based polymer around 1580 cm$^{-1}$ was determined. Since the absorption intensity measured by the ATR method depends on the wave number of measurement, the measured value was multiplied by the ratio up/us of the peak position us of polysulfone-based polymer and peak position up (wave number) of PVP thereby to correct the deviation due to the wave number dependency. Hydrophilic polymer (such as PVP) content in the layer near the surface of blood contacting surface was calculated as follows.

Content (% by weight) of hydrophilic polymer in layer near surface=$Cav \times Ap/As \times up/us$ where Cav is the content (% by weight) of hydrophilic polymer (such as PVP) determined in paragraph 10.

12. Aperture Ratio in Outer Surface of Hollow Fiber Membrane

Outer surface of the hollow fiber membrane was photographed (SEM photograph) under an electron microscope with 10,000 times magnification. The image was processed with an image analysis software, for example, Image Pro Plus (Media Cybernetics, Inc.) thereby to determine the aperture ratio in outer surface of hollow fiber membrane. In order to distinguish holes and clogged portions, enhancement and filtering operations were applied to the captured image. Then the holes were counted. In case the polymer chains in the layer below was seen through a hole, the hole was counted while ignoring the polymer chain. Area (A) of the measurement range and the total area (B) of the holes included in the measurement range were determined thereby to determine the aperture ratio (%) as B/A×100. This operation was repeated in 10 fields of view, and a mean value was taken. Scale setting was conducted in the initial operation, holes lying on the borderline of the measurement range were included in the count.

13. Mean Aperture Area in the Outer Surface of Hollow Fiber Membrane

Holes were counted in the same manner as in the preceding paragraph, while measuring the area of each hole. Holes lying on the borderline of the measurement range were excluded from the count. This operation was repeated in 10 fields of view, and the mean value of all holes was taken.

14. Measurement of Membrane Thickness of Hollow Fiber Membrane

Cross section of the hollow fiber membrane was observed with a projector of 200 times magnifying power, and inner diameter (A) and outer diameter (B) of hollow fibers having the largest, smallest and intermediate sizes in each field of view were measured. Mean membrane thickness of 5 hollow fibers was obtained for each field of view, by calculating the membrane thickness of each hollow fiber as follows.

$$\text{Membrane thickness} = (B-A)/2$$

15. Measurement of Skin Layer Thickness

Thickness of the skin layer of the hollow fiber membrane was determined as follows. In observation of a cross section of the hollow fiber membrane with a scanning electron microscope (SEM) with 3,000 times magnification, thickness of a portion where holes could not be observed which was defined as the skin layer was measured.

16. Stickiness of Hollow Fiber Membrane

About 10,000 hollow fiber membranes were bundled and packed into a module casing measuring 30 to 35 mm in diameter, which was sealed with 2-component urethane resin, thereby making a module. Leak test was conducted on 30 pieces for each level, and number of modules that developed sealing failure of urethane resin was counted.

17. Permeability to Endotoxin

Dialysis solution containing endotoxin at a concentration of 200 EU/L was sent from the dialysis solution inlet of the module at a flow rate of 500 ml/min, and filtration of dialysis solution containing endotoxin flowing from the outside to the inside of the hollow fiber membrane was conducted for 2 hours at a filtration rate of 15 ml/min. The dialysis solution filtered from the outside to the inside of the hollow fiber membrane was stored, and endotoxin concentration in the stored liquid was measured. Measurement of the endotoxin concentration was conducted using Limulus ESII Test Wako manufactured by Wako Pure Chemical Industries, Ltd.), according to the procedure specified in the instruction manual thereof (gelatinization reversal method).

18. Blood Retention of Hollow Fiber Membrane

A module having membrane area of 1.5 m² was filled with physiological saline on the dialysis solution side thereof, and 200 ml of heparin-added blood taken from a healthy human was packed in a blood bag. The blood bag was connected to the module with a tube, and the blood was circulated at a flow rate of 100 ml/min at 37° C. for one hour. Blood was sampled at the start of circulation and 60 minutes after the start of circulation, and the numbers of white blood cells and platelets were counted. The counts were corrected with the hematocrit value.

Corrected value=Count (60 minutes)×Hematocrit value (0 minutes)/Hematocrit value (60 minutes)

Changing rates of white blood cells and platelets were calculated from the corrected values.

Changing rate=Corrected value (60 minutes)/Value before circulation×100

After circulation for 60 minutes, blood was recovered with physiological saline, and the number of fibers retaining blood was counted and ranked as follows.

14 fibers or less: A
15 to 50 fibers: B
51 fibers or more: C

19. Priming Property

With the port for dialysis solution stopped, distilled water for injection was flowed from the blood inlet at a rate of 200 mL/min. When the distilled water for injection reached the outlet port, the module casing was lightly tapped 5 times with a clamp to carry out deaeration for 10 seconds. Then the number of bubbles passing for 1 minute was counted under visual observation, and ranked as follows.

10 bubbles/min or less: A
11 to 30 bubbles/min: B
30 bubbles/min or more: C

20. Measurement of Undissolved PVP

In the case of a module filled with liquid, first the liquid was drained. Then after flowing pure water through the passage on dialysis solution side at a rate of 500 mL/min for 5 minutes, pure water was flowed through the passage on blood side at a rate of 200 mL/min for 5 minutes. Last, pure water was flowed so as to pass through the membrane from blood side to the dialysis solution side at a rate of 200 mL/min, thus completing the cleaning operation. The hollow fiber membrane bundle was taken out of the module, and was freeze-dried, which was used as the sample for measuring unsoluble component. In the case of dry hollow fiber membrane bundle module, too, similar cleaning process was carried out to obtain measurement sample.

Whether was polyvinyl pyrrolidone turned unsoluble or not by crosslinking was determined by the solubility of the membrane after crosslinking in dimethylformamide. Specifically, 10 g of the membrane after crosslinking is sampled and dissolved in 100 ml of dimethylformamide. The solution is subjected to centrifugal separation at a speed of 1500 rpm for 10 minutes, and the supernatant liquid is discarded. The remaining insoluble matter is mixed with 100 ml of dimethylformamide and was, after stirring, subjected to centrifugal separation under the same conditions, with the supernatant liquid being discarded. The remainder is mixed with 100 ml of dimethylformamide and was, after stirring, subjected to centrifugal separation under the same conditions, with the supernatant liquid being discarded. Then the solid residue was dried hard, of which weight was used to determine the proportion of insoluble matter.

21. Amount of Hydrogen Peroxide Elution

Extract liquid was obtained by the method specified in the Approval Standard for Dialysis-type Artificial Kidney Apparatus, concentration of hydrogen peroxide in the extract liquid was determined by colorimetry. This operation was conducted for each of 10 pieces obtained by cutting the hollow fiber membrane at intervals of 2.7 cm into equal parts.

In the case of dry hollow fiber membrane, 100 ml of pure water was added to 1 g of hollow fiber membrane bundle so as to extract at 70° C. for one hour. 0.2 ml of a colorimetrical reagent prepared by controlling a mixture of hydrogen chloride solution of $TiCl_4$ and an aqueous Na salt solution of 4-(2-pyridylazo)resorcinol, which was mixed in equivalent molar ratio with 0.2 ml of 0.4 mM ammonia chloride (pH 8.6), was added to 2.6 ml of the extract liquid. After heating at 50° C. for 5 minutes, the mixture was cooled to the room temperature, and was subjected to measurement of light absorption at 508 nm. The amount of a hydrogen peroxide elution was quantitatively determined by using a calibration curve obtained by measuring the sample similarly.

In the case of a wet hollow fiber membrane module, physiological saline was flowed through the passage on dialysis solution side at a rate of 500 ml/min for 5 minutes, and then the liquid was flowed through the passage on blood side at a rate of 200 ml/min. Then after flowing from the blood side to the dialysis solution side at a rate of 200 mL/min for 3 minutes while applying filtration, the membrane was freeze-dried thereby to obtain dry membrane. The dry membrane was used in the quantitative determination.

22. Elution of Polyvinyl Pyrrolidone (PVP)

1.25 ml of aqueous solution of citric acid of 0.2 mol and 0.5 ml of aqueous solution of iodine of 0.006 N were added to 2.5 ml of the extract liquid obtained as described above and mixed well. After being left to stand still at room temperature for 10 minutes, light absorbance at 470 nm was measured. Quantitative determination was carried out by using a calibration curve obtained by the method described above using polyvinyl pyrrolidone of the sample.

23. Leakage of Albumin

Bovine blood at a temperature of 37° C. with citric acid added thereto for suppressing coagulation was diluted with bovine plasma, and was processed to control hematocrit value to 30%. The blood was sent to the blood purifier at a rate of 200 mL/min, so as to filtrate the blood at a rate of 20 mL/min. The filtrate was returned into the blood, thereby constituting a circulating system. In order to prevent hemolysis, the blood purifier had been completely substituted with physiological saline. 5 minutes after the start of circulation, it was checked to see that predetermined flow rate was achieved, and 1 cc of the filtrate was sampled 15 minutes after the start of circulation and every 15 minutes thereafter. The blood was sampled at the inlet and outlet of the blood purifier at 15 minutes, 60 minutes and 120 minutes after the start, with the samples subjected to centrifugal separation to obtain plasma which was used as the test liquid. Albumin concentrations in the filtrate, blood and plasma were determined by means of brom cresol green (BCG method) using A/G B Test Wako (manufactured by Wako Pure Chemical Industries, Ltd.). The concentrations were used to determine the sieving coefficient of albumin as follows.

$$SCalb = 2*Cf/(Ci+Co)$$

where Cf is the albumin concentration in the filtrate, Ci is the albumin concentration in the blood and the plasma at the inlet of the blood purifier, and Co is the albumin concentration in the blood and the plasma at the outlet of the blood purifier. The values of sieving coefficient of albumin at the times of 15 minutes and 120 minutes were obtained by substituting the data obtained at the times of 15 minutes and 120 minutes, respectively, in this formula.

The amount of albumin leakage on the basis of 3 L water removal was determined as follows. Samples were taken at times of 30 minutes, 45 minutes, 60 minutes, 75 minutes, 90 minutes, 105 minutes and 120 minutes, and albumin concentrations in the filtrate, blood and plasma were determined by means of brom cresol green (BCG method) using A/G B Test Wako (manufactured by Wako Pure Chemical Industries, Ltd.). These data were plotted with albumin (TAL [mg/dL]) along the vertical axis and ln(time [min]) (lnT) along the horizontal axis, and curve fitting was carried out by first order approximation using a spreadsheet program such as EXCEL-XP of Microsoft Corp., thereby to determine the constants a and b of expression TAL=a×lnT+b (correlation coefficient is preferably 0.95 or larger, more preferably 0.97 or larger and still more preferably 0.99 or larger). The expression TAL=a×lnT+b was integrated from T=0 to 240, and the result was divided by 240 [min] so as to calculate the mean albumin leakage concentration [mg/dL]. The mean albumin leakage concentration was multiplied by 30 dL, thereby to obtain the amount of albumin leakage on the basis of 3 L water removal.

The water content of the permselective separation membrane in the present invention was calculated as follows.

$$\text{Water content (\% by weight)} = 100 \times (Ww - Wd)/Wd$$

where Ww is the weight (g) of the permselective separation membrane, and Wd is the weight (g) of the permselective separation membrane after drying in a oven at 120° C. for 2 hours. By controlling Ww within a range from 1 to 2 g, the sample can be turned into absolute dry condition (the state where the weight will not change any more) 2 hours later.

Example 1

18% by weight of polyethersulfone (Sumika Excel 5200P manufactured by Sumika Chemitex Co., Ltd.), 3% by weight of polyvinyl pyrrolidone (Colidone K-90 manufactured by BASF AG) and 27% by weight of dimethylacetamide (DMAc) were mixed in a twin-screw kneader. The kneaded mixture thus obtained was charged into a stirring dissolution tank where 47.5% by weight of DMAc and 4.5% by weight of water had been charged, and was dissolved through 3 hours of stirring. Kneading and dissolution were carried out by cooling so as to prevent the solution temperature from rising above 30° C. Then the dissolution tank was evacuated to −500 mmHg and was immediately sealed and left to stand in this state for 15 minutes so that composition of the membrane forming solution would not change through evaporation of the solvent or the like. This operation was repeated 3 times so as to deaerate the membrane forming solution. The proportion of polyvinyl pyrrolidone to polysulfone-based polymer in the membrane forming solution was 16.7% by weight and the hydrogen peroxide content in the polyvinyl pyrrolidone was 100 ppm. Air in the raw material feeder tanks and the dissolution tank was substituted with nitrogen gas, and oxygen concentration measured in the dissolution tank was 0.06%. Froude number and Reynolds number during dissolution were 1.1 and 120, respectively. The membrane forming solution thus obtained was passed through a two-stage sintered filter of 15 μm and 10 μm. Then the membrane forming solution was discharged at a rate of 2.3 cc/min from a tube-in-orifice type nozzle heated to 70° C., while aqueous solution of 46% by weight of DMAc which had been deaerated at a pressure of −700 mmHg for 30 minutes was discharged at 25° C. as the internal liquid at the same time. The discharged material was passed through a dry section (air gap) of 700 mm isolated from the atmosphere by a spinning tube, solidified in an aqueous solution of 20% by weight of DMAc kept at temperature of 70° C., and was wound around a skein in wet condition. Mean width of the nozzle slit was 60 µm, over maximum width of 61 µm and minimum width of 59 µm, and the ratio of maximum width to minimum width of the slit was 1.03. Pressure loss in the nozzle was $2.9 \times 10^8$ Pa·s, shear stress of the membrane forming solution in the passage $1.5 \times 10^6$ s$^{-1}$, and the time taken to pass the passage was $1.3 \times 10^{-3}$ sec. A draft ratio was 1.3. A roller having mirror-finished surface was used for changing the yarn guide in the spinning process, and stationary guide having matt-finished surface was used.

A bundle of about 10,000 hollow fiber membranes wrapped by a polyethylene film around thereof was cleaned by immersing in an aqueous solution of isopropanol 40% by volume at 30° C. for 30 minutes twice. The hollow fiber membrane bundle which was cleaned was rinsed in RO water so as to substitute isopropanol with water, and was dewatered by means of a centrifugal deliquoring device at a speed of 600 rpm for 5 minutes. The wet hollow fiber membrane bundles thus obtained were placed in a stack of 12 pieces by 2 levels on a rotary table installed in a dryer, and were dried under the following conditions. After heating the hollow fiber membrane bundle by microwave irradiation with output power of 5 kW under a reduced pressure of 7 kPa for 30 minutes, microwave irradiation was stopped and the degree of pressure reduction was decreased to 1.5 kPa, this conditions being maintained for 3 minutes. Then the degree of pressure reduction was returned to 7 kPa and microwave irradiation with 0.5 kW was applied to heat the hollow fiber membrane bundle for 10 minutes, followed by shutting down of microwave irradiation and decreasing of the degree of pressure reduction, with the condition of 0.7 kPA being maintained for 3 minutes. Then the degree of pressure reduction was returned to 7 kPa and microwave irradiation with 0.2 kW was applied to heat the hollow fiber membrane bundle for 8 minutes. Microwave irradiation was then stopped and the degree of pressure reduction was decreased to 0.5 kPA which was maintained for 5 minutes, thereby conditioning the hollow fiber membrane bundle and completing the drying process. The highest temperature achieved on the surface of the hollow fiber membrane bundle was 65° C. The water content of the hollow fiber membrane bundle before drying was 310% by weight, the water content of the hollow fiber membrane bundle after the first stage was 38% by weight, the water content of the hollow fiber membrane bundle after the second stage was 14% by weight, and water content of the hollow fiber membrane bundle after the third stage was 2.3% by weight. The hollow fiber membrane thus obtained had inner diameter of 198 µm, membrane thickness of 27 µm and skin layer thickness of 0.9 µm. Properties of the hollow fiber membrane are shown in Table 1.

The amount of a hydrogen peroxide elution was measured on 1 g of dry hollow fiber membrane taken from each of 10 pieces obtained by cutting the hollow fiber membrane at intervals of 2.7 cm in the longitudinal direction into equal parts. The amount of a hydrogen peroxide elution remained stable at a low level in all portions. Measured values are shown in Table 2.

The hollow fiber membrane bundles conditioned as described above were packed in a module casing made of polycarbonate. The module was fixed on both ends with urethane resin, and the hollow portion of the hollow fiber membrane was opened by cutting the resin ends. A mini-module of the hollow fiber membrane having effective length 115 mm of the hollow fiber membrane and membrane area of 1.0 m² was made by attaching cap having inlet hole. This module was sterilized by irradiating 25 kGy of γ ray in atmosphere without oxygen. The module thus obtained showed good priming property.

The module thus obtained was evaluated for sieving coefficient of albumin, α1-microglobulin clearance, the amount of α1-microglobulin adsorbed, blood leakage, endotoxin permeability, blood retention and burst pressure. A portion cut out of the hollow fiber membrane that was sterilized by irradiation of γ ray was subjected to elution test. Concentration of elution was 5 ppm for polyvinyl pyrrolidone and 2 ppm maximum for hydrogen peroxide, showing satisfactory performance.

Microscope observation of the outer surface of the hollow fiber membrane taken out of the blood purifier showed no flaw or other defects. The hollow fiber membrane proved satisfactorily in all properties, showing high practical value for used in blood purifier. Results of evaluation are shown in Table 1.

Comparative Example 1

The hollow fiber membrane and the module of Comparative Example 1 were made in the same manner as in Example 1, except for changing the composition of the membrane forming solution to 18.0% by weight of polyethersulfone (Sumika Excel 5200P manufactured by Sumika Chemitex Co., Ltd.), 0.5% by weight of polyvinyl pyrrolidone (Colidone K-90 manufactured by BASF AG), 77.0% by weight of dimethylacetamide (DMAc) and 4.5% by weight of RO water, changing the internal liquid temperature to 50° C. and changing the solidification liquid to RO water. The proportion of polyvinyl pyrrolidone to polysulfone-based polymer in the membrane forming solution was 2.8% by weight, and the difference in temperature between the membrane forming solution and the internal liquid when discharged from the nozzle was 20° C. These results are shown in Table 1 and Table 2.

In the hollow fiber membrane obtained in the comparative example, polyvinyl pyrrolidone content in the uppermost layer of the inner surface of the hollow fiber membrane was too low, and the skin layer was too thick, thus resulting in unsatisfactory selective permeability of proteins. Also because the polyvinyl pyrrolidone content on the inner surface was too low, blood retention was not good. Low polyvinyl pyrrolidone content on the inner surface of the hollow fiber membrane and outer surface of the hollow fiber membrane also resulted in unsatisfactory priming property. Thus the hollow fiber membrane obtained in the comparative example had low practical value for use in blood purifier.

Comparative Example 2

The hollow fiber membrane and the module of Comparative Example 1 were made in the same manner as in Example 1, except for changing the composition of the membrane forming solution to 18.0% by weight of polyethersulfone (Sumika Excel 5200P manufactured by Sumika Chemitex Co., Ltd.), 10.0% by weight of polyvinyl pyrrolidone (Colidone K-90 manufactured by BASF AG), 67.5% by weight of dimethylacetamide (DMAc) and 4.5% by weight of RO water, changing the concentration of the internal liquid to 65% by weight and changing the liquid temperature to 45° C. The proportion of polyvinyl pyrrolidone to polysulfone-based polymer in the membrane forming solution was 55.5% by weight. These results are shown in Table 1 and Table 2.

In the hollow fiber membrane obtained in the comparative example, polyvinyl pyrrolidone content in the uppermost layer of the inner surface of the hollow fiber membrane was too high, and the pores had larger diameters, thus resulting in unsatisfactory selective permeability of proteins. Larger amount of polyvinyl pyrrolidone eluted. With regards to the low protein selectivity, in addition to the high polyvinyl pyrrolidone content on the inner surface, influences are supposedly exerted by the other factors which affect the protein permeability such as the mean pore diameter of the inner surface and the pore size distribution, which were different from those of the hollow fiber membrane obtained in Example 1. Also because the polyvinyl pyrrolidone content on the outer surface was high, hollow fiber membranes stuck with each other. Permeation of endotoxin was also observed.

The hollow fiber membranes thus obtained were assembled into a blood purifier, and was subjected to air leak test in which bubbles were generated from the bonding junction of modules. Bonding failure due to sticking of the hollow fiber membranes was suspected. Thus the hollow fiber membrane obtained in the comparative example had low practical value for use in blood purifier.

Comparative Example 3

The hollow fiber membrane and the module of Comparative Example 3 were made in the same manner as in Comparative Example 2, except for changing the number of cleaning operations in aqueous solution of 50% by volume isopropanol to 6 times. Properties of the hollow fiber membrane and the module thus obtained are shown in Table 1 and Table 2.

In the hollow fiber membrane obtained in the comparative example, polyvinyl pyrrolidone content in the outer surface decreased, thus resulting in higher hydrophobicity due to excessive cleaning. As a result, although permeation of endotoxin which was one of the problems of the hollow fiber membrane obtained in Comparative Example 2 was solved, priming property deteriorated. Also because the state of the inner surface remained the same, the problems of Comparative Example 2 related to the permselective separation membrane of Example 2 originating in the characteristics of the inner surface was not solved.

Comparative Example 4

The membrane forming solution was prepared by the same method as in Example 1, with a composition of 18.0% by weight of polyethersulfone (Sumika Excel 5200P manufactured by Sumika Chemitex Co., Ltd.), 5.0% by weight of polyvinyl pyrrolidone (Colidone K-90 manufactured by BASF AG), 75.0% by weight of dimethylacetamide (DMAc) and 2.0% by weight of RO water. The proportion of polyvinyl pyrrolidone content to polysulfone-based polymer content in the membrane forming solution was 27.7% by weight. The polyvinyl pyrrolidone containing 100 ppm of hydrogen peroxide was used. The membrane forming solution thus obtained was passed through a two-stage sintered filter of 15 μm and 10 μm. Then the membrane forming solution was discharged at a spinning rate of 50 m/min from a tube-in-orifice type nozzle heated to 70° C., while aqueous solution of 46% by weight of DMAc which had been deaerated at a pressure of −700 mmHg for 30 minutes was discharged at 25° C. as the internal liquid at the same time. The discharged material was passed through a dry section (air gap) of 700 mm isolated from the atmosphere by a spinning tube, solidified in an aqueous solution of 20% by weight of DMAc kept at temperature of 35° C., and was wound around a skein in wet condition. Mean width of the nozzle slit was 60 μm, with maximum width of 61 μm and minimum width of 59 μm, and the ratio of maximum width to minimum width of the slit was 1.03. A draft ratio was 1.15. The hollow fiber membrane pulled out of the solidification bath was passed through washing water of a temperature of 85° C. for 45 seconds. After removing the solvent and excess of polyvinyl pyrrolidone, the hollow fiber membrane was wound up.

A bundle of about 10,000 hollow fiber membranes wrapped by a polyethylene film around thereof in the same manner as in Example 1 was put into, without being cleaned, a microwave dryer comprising an oven with a reflector installed therein so as to be capable of uniform heating, and was heated in the following procedure. Microwave irradiation was applied with output power of 1.5 kW for 30 minutes, output power of 0.5 kW for 10 minutes, and output power of 0.2 kW for 8 minutes under a reduced pressure of 7 kPa, thereby decreasing the water content to 2.9% by weight. The highest temperature achieved on the surface of the hollow fiber membrane bundle was 65° C. A roller having mirror-finished surface was used for changing the yarn guide in the spinning process, and stationary guide having matt-finished surface was used. The hollow fiber membrane thus obtained had inner diameter of 200 μm, membrane thickness of 35 μm and skin layer thickness of 1.7 μm. Properties of the hollow fiber membrane are shown in Table 1.

The amount of a hydrogen peroxide elution was measured on 1 g of dry hollow fiber membrane taken from each of 10 pieces obtained by cutting the hollow fiber membrane at intervals of 2.7 cm in the longitudinal direction into equal parts. The amount of a hydrogen peroxide elution remained stable at a low level in all portions. Measured values are shown in Table 2. In the hollow fiber membrane obtained in this Comparative Example, however, sticking was observed in the dried hollow fiber membrane bundle, making it difficult to assemble into blood purifier in many cases, as the resin bonding the end portion could not be inserted smoothly into the space between the hollow fiber membranes when assembling the blood purifier.

Comparative Example 5

The hollow fiber membrane and the module were made in the same manner as in Comparative Example 1, except for changing the filter used in filtration of the membrane forming solution to a single stage sintered filter of 30 μm, changing the tube-in-orifice type nozzle to one having a mean width of the nozzle slit of 60 μm, with maximum width of 65 μm and minimum width of 55 μm, the ratio of maximum width to minimum width of the slit being 1.18, and changing the draft ratio to 0.95.

Properties of the hollow fiber membrane and the module thus obtained are shown in Table 1 and Table 2. The hollow fiber membrane and the module obtained in this Comparative Example had problems similar to those of the product obtained in Comparative Example 1. Moreover, since the thickness deviation of the hollow fiber membrane and uniformity of phase separation became lower, burst pressure was low and leakage of blood cells was observed in 5 out of 30 modules in blood leak test using bovine blood. Thus the hollow fiber membrane obtained in the comparative example had low practical value for use in blood purifier.

Comparative Example 6

The hollow fiber membrane and the module were made in the same manner as in Comparative Example 1, except for changing the conditions as follows:

(1) Polyvinyl pyrrolidone having hydrogen peroxide content of 500 ppm was used to prepare the membrane forming solution.

(2) The membrane forming solution was prepared by charging all the raw materials directly into a dissolution tank equipped with a stirrer at the same time, without kneading, and dissolving at liquid temperature of 70° C.

(3) A tube-in-orifice type nozzle having a mean width of the nozzle slit of 80 µm, with a maximum width of 81 µm and a minimum width of 79 µm, the ratio of the maximum width to the minimum width of the slit being 1.03, and L/D ratio of the membrane forming solution passage being 2.5 was used.

(4) The draft ratio was set to 1.00.

(5) The wet hollow fiber membrane was dried until the water content decreased to 0.2% by weight.

Properties of the hollow fiber membrane and the module thus obtained are shown in Table 1 and Table 2.

The hollow fiber membrane and the module obtained in this Comparative Example showed much amount of hydrogen peroxide elution, in addition to the problem of the product obtained in Comparative Example 1.

Dry sample of the hollow fiber membrane obtained in this Comparative Example used in the measurement of amount of hydrogen peroxide elution was put into a dry box (air atmosphere) wherein humidity was controlled to 50% RH and was kept therein at room temperature for 3 months. Then extraction was carried out by the procedure specified in the Approval Standard for Dialysis-type Artificial Kidney Apparatus, and UV (220 to 350 nm) absorbance was measured. UV (220 to 350 nm) absorbance was less than the approval criterion of 0.1 in all portions at the start of storage, but exceeded the approval criterion of 0.1 in all portions after storage, indicating lower stability in storage. In the hollow fiber membranes of Examples 1 to 3 and Comparative Examples 1 to 5 where an amount of the hydrogen peroxide elution was low, UV (220 to 350 nm) absorbance showed no substantial change while maintaining a level not higher than 0.06, after being stored similarly. The hollow fiber membrane obtained in this comparative example contained much hydrogen peroxide, and therefore polyvinyl pyrrolidone supposedly deteriorated due to the hydrogen peroxide, resulting in increasing UV (220 to 350 nm) absorbance with time. Thus the hollow fiber membrane obtained in this Comparative Example had low practical value for use in blood purifier.

Example 2

The membrane forming solution was prepared by the same method as in Example 1, with a composition of 18.0% by weight of polyethersulfone (Sumika Excel 4800P manufactured by Sumika Chemitex Co., Ltd.), 2.5% by weight of polyvinyl pyrrolidone (Colidone K-90 manufactured by BASF AG), 74.5% by weight of dimethylacetamide (DMAc) and 5.0% by weight of RO water. The proportion of polyvinyl pyrrolidone content to polysulfone-based polymer content in the membrane forming solution was 13.8% by weight. The polyvinyl pyrrolidone used as the raw material contained 100 ppm of hydrogen peroxide. The membrane forming solution thus obtained was passed through a two-stage sintered filter of 15 µm and 10 µm. Then the membrane forming solution was discharged at a spinning rate of 2.1 cc/min from a tube-in-orifice type nozzle heated to 70° C., while aqueous solution of 50% by weight of DMAc which had been deaerated at a pressure of −700 mmHg for 30 minutes was discharged at 30° C. as the internal liquid at the same time. The discharged material was passed through an air gap of 750 mm isolated from the atmosphere by a spinning tube, solidified in an aqueous solution of 25% by weight of DMAc kept at temperature of 65° C., and was wound up around a skein in wet condition. Mean width of the nozzle slit was 60 µm, with maximum width of 61 µm and minimum width of 59 µm, and the ratio of maximum width to minimum width of the slit was 1.03. A draft ratio was 1.3. Pressure loss of the membrane forming solution in the nozzle was $2.15 \times 10^8$ Pa·s, shear stress was $1.1 \times 10^6$ s$^{-1}$, and the time taken to pass the passage was $1.2 \times 10^{-3}$ sec. The hollow fiber membrane pulled out of the solidification bath was passed through washing water of a temperature of 85° C. for 45 seconds, so as to remove the solvent and excess of polyvinyl pyrrolidone, and then the hollow fiber membrane was wound up. A roller having mirror-finished surface was used for changing the yarn guide in the spinning process, and stationary guide having matt-finished surface was used.

A bundle of about 10,000 hollow fiber membranes wrapped by a polyethylene film similar to that of Example 1 around thereof was cleaned by immersing in an aqueous solution of 30% by volume of ethanol at 30° C. for 30 minutes three times. The hollow fiber membrane bundle which washed was rinsed in RO water so as to substitute ethanol with water, and was then dewatered by means of a centrifugal deliquoring device at a speed of 600 rpm for 5 minutes. The wet hollow fiber membrane bundles thus obtained were dried by sending air of 65° C. at a flow rate of 0.3 L/sec for 3 hours, then 35° C. at a flow rate of 0.05 L/sec for 20 hours, with a blow dryer having flow passage disposed in the longitudinal direction. For an early period of 3 hours of the drying process, direction of blowing air was changed by 180 degrees every 20 minutes, and was changed every hour for the last 20 hours. The water content of the hollow fiber membrane bundle before drying was 290% by weight, the water content of the hollow fiber membrane bundle after 3 hours of drying was 67% by weight, and the water content of the hollow fiber membrane bundle after completing the drying was 2.4% by weight. Nitrogen gas was used as the drying gas. The hollow fiber membrane thus obtained had an inner diameter of 200 µm, a membrane thickness of 29 µm and a skin layer thickness of 0.7 µm. Properties of the hollow fiber membrane are shown in Table 1.

The amount of a hydrogen peroxide elution was measured on 1 g of dry hollow fiber membrane taken from each of 10 pieces obtained by cutting the hollow fiber membrane at intervals of 2.7 cm in the longitudinal direction into equal parts. The amount of a hydrogen peroxide elution remained stable at a low level in all portions. Measured values are shown in Table 2.

The hollow fiber membrane bundle conditioned as described above was packed in a module casing made of polycarbonate. The module was fixed on both ends with urethane resin, and the hollow portion of the hollow fiber membrane was opened by cutting the resin ends. A module of the hollow fiber membrane having effective length 115 mm of the hollow fiber membrane and membrane area of 1.0 m$^2$ was made by attaching cap having inlet hole. This module was sterilized by irradiating 25 kGy of γ ray in atmosphere without oxygen. The module thus obtained showed good priming property.

The module thus obtained was evaluated for sieving coefficient of albumin, α1-microglobulin clearance, the amount of α1-microglobulin adsorbed, blood leakage, endotoxin permeability, blood retention and burst pressure. A portion cut out of the hollow fiber membrane that was sterilized by irradiation of γ ray was subjected to elution test. Concentration of elution was 5 ppm for polyvinyl pyrrolidone and 3 ppm for hydrogen peroxide elution, showing satisfactory performance.

Microscope observation of the outer surface of the hollow fiber membrane taken out of the blood purifier showed no flaw or other defects. The hollow fiber membrane proved satisfactorily in all properties, showing high practical value for used in blood purifier. Results of evaluation are shown in Table 1.

Example 3

The membrane forming solution was prepared by the same method as in Example 1, with a composition of 18.5% by weight of polysulfone (P-3500 manufactured by BP Amoco Polymers, Inc.), 3.0% by weight of polyvinyl pyrrolidone (Colidone K-60 manufactured by BASF AG), 74.5% by weight of dimethylacetamide (DMAc) and 4.0% by weight of RO water. The proportion of polyvinyl pyrrolidone to polysulfone-based polymer in the membrane forming solution was 16.2% by weight. The polyvinyl pyrrolidone used as the raw material contained 150 ppm of hydrogen peroxide. The membrane forming solution thus obtained was passed through a two-stage sintered filter of 15 μm and 10 μm. Then the membrane forming solution was discharged at a spinning rate of 2.4 cc/min from a tube-in-orifice type nozzle heated to 5° C., while an aqueous solution of 35% by weight of DMAc which had been deaerated at a pressure of −700 mmHg for 30 minutes was discharged at 15° C. as the internal liquid at the same time. The discharged material was passed through an air gap of 650 mm isolated from the atmosphere by a spinning tube, solidified in an aqueous solution of 15% by weight of DMAc kept at temperature of 60° C., and was wound up around a skein in wet condition. The tube-in-orifice type nozzle had mean width of the nozzle slit of 60 μm, with maximum width of 61 μm and minimum width of 59 μm, and the ratio of maximum width to minimum width of the slit was 1.03. Pressure loss of the membrane forming solution in the nozzle was $2.3 \times 10^8$ Pa·s, shear stress was $1.2 \times 10^6$ s$^{-1}$, and the time taken to pass the passage was $1.5 \times 10^{-3}$ sec. The draft ratio was 1.3. A roller having mirror-finished surface was used for changing the yarn guide in the spinning process, and stationary guide having matt-finished surface was used.

A bundle of about 10,000 hollow fiber membranes wrapped by a polyethylene film similar to that of Example 1 around thereof was cleaned by immersing in an aqueous solution of 40% by volume of ethanol at 30° C. for 30 minutes two times. The hollow fiber membrane bundle which was cleaned was rinsed in RO water so as to substitute isopropanol with water, and was dewatered by means of a centrifugal deliquoring device at a speed of 600 rpm for 5 minutes. The hollow fiber membrane bundle thus obtained was placed in a stack of 48 pieces by 2 levels on a rotary table installed in a dryer having a microwave reflector installed therein so to facilitate uniform heating, and were dried under the following conditions. The hollow fiber membrane bundle was heated by microwave irradiation with output power of 12 kW under a reduced pressure of 7 kPa for 15 minutes. Then microwave irradiation was stopped and the degree of pressure reduction was decreased to 1 kPa, with this conditions being maintained for 3 minutes so as to evaporate water. Then the degree of pressure reduction was returned to 7 kPa and microwave irradiation with output power of 3.5 kW was applied to heat the hollow fiber membrane bundle for 7 minutes. After heating, microwave irradiation was stopped and the degree of pressure reduction was decreased to 0.7 kPA which was maintained for 3 minutes. Then the degree of pressure reduction was returned to 7 kPa and microwave irradiation was resumed with output power of 2.5 kW maintained for 6 minutes. Then microwave irradiation was stopped and the degree of pressure reduction was decreased to 0.5 kPa, with this conditions being maintained for 7 minutes so as to dry. The hollow fiber membrane bundle was further put into a blowing dryer to dry at 35° C. for 3 hours so as to equalize the water content. The water content of the hollow fiber membrane bundle before drying by microwave irradiation was 306% by weight, the water content after the first stage was 33% by weight, the water content after the second stage was 16% by weight, the water content after the third stage was 6% by weight, and water content after the blow drying was 1.7% by weight. The highest temperature achieved on the surface of the hollow fiber membrane bundle was 54° C. The hollow fiber membrane thus obtained had inner diameter of 197 μm, membrane thickness of 30 μm and skin layer thickness of 0.7 μm. Properties of the hollow fiber membrane are shown in Table 1.

The amount of a hydrogen peroxide elution was measured on 1 g of dry hollow fiber membrane taken from each of 10 pieces obtained by cutting the hollow fiber membrane at intervals of 2.7 cm in the longitudinal direction into equal parts. The amount of a hydrogen peroxide elution remained stable at a low level in all portions. Measured values are shown in Table 2.

The hollow fiber membrane bundle conditioned as described above was packed in a module casing made of polycarbonate. The module was fixed on both ends with urethane resin, and was opened by cutting the resin ends. A mini-module of the hollow fiber membrane having effective length 115 mm of the hollow fiber membrane and membrane area of 1.0 m$^2$ was made by attaching cap having inlet hole.

This module was sterilized by irradiating 25 kGy of γ ray in atmosphere without oxygen. The module thus obtained showed good priming property.

The module thus obtained was evaluated for sieving coefficient of albumin, α1-microglobulin clearance, the amount of α1-microglobulin adsorbed, blood leakage, endotoxin permeability, blood retention and burst pressure. A portion cut out of the hollow fiber membrane that was sterilized by irradiation of γ ray was subjected to elution test. Concentration of elution was 4 ppm for polyvinyl pyrrolidone and 2 ppm for hydrogen peroxide elution, showing satisfactory performance.

Microscope observation of the outer surface of the hollow fiber membrane taken out of the blood purifier showed no flaw or other defects. The hollow fiber membrane proved satisfactorily in all properties, showing high practical value for used in blood purifier. The evaluation results are shown in Table 1.

TABLE 1

| | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Sieving coefficient of albumin after 15 minutes [A] | 0.05 | 0.07 | 0.06 | 0.006 | 0.17 | 0.11 | — | 0.006 | 0.004 |
| Sieving coefficient of albumin after 2 hours [B] | 0.01 | 0.02 | 0.02 | 0.003 | 0.09 | 0.07 | — | 0.003 | 0.003 |

TABLE 1-continued

|  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| [B]/[A] | 0.20 | 0.29 | 0.33 | 0.50 | 0.53 | 0.64 | — | 0.50 | 0.75 |
| Albumin leakage (g/3 L) | 1.9 | 2.3 | 2.0 | 0.3 | 5.8 | 4.2 | — | 0.3 | 0.2 |
| α1 MG clearance (ml/min (1 m$^2$)) | 19 | 27 | 24 | 8 | 35 | 28 | — | 9 | 4 |
| Amount of α1 MG adsorbed (mg/m$^2$) | 8 | 16 | 6 | 25 | 1 | 1 | — | 28 | 43 |
| Water permeability (ml/m$^2$/hr/mmHg) | 340 | 375 | 358 | 470 | 280 | 266 | — | 530 | 493 |
| Burst pressure (MPa) | 0.8 | 0.6 | 0.9 | 0.8 | 0.5 | 0.5 | — | 0.2 | 0.8 |
| Thickness deviation (ratio) | 0.9 | 0.9 | 0.9 | 0.9 | 0.9 | 0.9 | 0.9 | 0.4 | 0.8 |
| Blood leakage (pieces) | 0 | 0 | 0 | 0 | 0 | 0 | — | 5 | 0 |
| PVP content in uppermost layer of inner surface [C] (% by weight) | 30 | 23 | 33 | 17 | 45 | 43 | 30 | 18 | 15 |
| PVP content in layer near inner surface (% by weight) | 11 | 12 | 12 | 5 | 26 | 18 | 12 | 5 | 6 |
| PVP content in uppermost layer of outer surface [D] (% by weight) | 34 | 30 | 40 | 18 | 43 | 22 | 50 | 17 | 16 |
| [D]/[C] | 1.13 | 1.30 | 1.21 | 1.05 | 0.96 | 0.51 | 1.67 | 0.94 | 1.07 |
| Mean pore area of outer surface (μm$^2$) | 0.5 | 0.6 | 0.7 | 0.3 | 0.3 | 0.3 | 0.6 | 0.3 | 0.4 |
| Aperture ratio of outer surface (%) | 25 | 25 | 28 | 20 | 28 | 27 | 25 | 20 | 26 |
| Membrane thickness (μm) | 27 | 29 | 30 | 35 | 35 | 35 | 36 | 34 | 50 |
| Skin layer thickness (μm) | 0.9 | 0.7 | 0.7 | 2.7 | 3.5 | 3.5 | 0.7 | 2.5 | 2.7 |
| Number of pieces stuck | 0 | 0 | 0 | 0 | 15 | 3 | 25 | 0 | 0 |
| PVP elution (ppm) | 5 | 5 | 4 | 2 | 18 | 13 | — | 2 | 5 |
| Amount of hydrogen peroxide elution [Maximum value] (ppm) | 2 | 3 | 2 | 3 | 2 | 3 | 2 | 2 | 20 |
| Water content (% by weight) | 2.3 | 2.4 | 1.7 | 2.3 | 2.3 | 2.3 | 2.9 | 2.2 | 0.2 |
| Endotoxin permeation | ND | ND | ND | ND | observed | ND | — | ND | ND |
| Degree of PVP crosslinking | Not cross-linked | Not crosslinked | Not crosslinked | Not crosslinked | Not crosslinked | Not crosslinked | Not crosslinked | Not crosslinked | Not crosslinked |
| Blood retention | A | A | A | C | A | A | — | C | C |
| Priming property | A | A | A | C | A | C | — | C | C |

ND: not detectable

TABLE 2

| | Amount of hydrogen peroxide elution (ppm) | | | | | | | | |
|---|---|---|---|---|---|---|---|---|---|
| Measuring point | Example 1 | Example 2 | Example 3 | Comparative Example 1 | Comparative Example 2 | Comparative Example 3 | Comparative Example 4 | Comparative Example 5 | Comparative Example 6 |
| 1 | ND | 1 | ND | 1 | ND | 2 | 2 | 2 | 15 |
| 2 | 2 | ND | 1 | 2 | ND | 2 | 1 | 1 | 2 |

TABLE 2-continued

Amount of hydrogen peroxide elution (ppm)

| Measuring point | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| 3 | 1 | 2 | 2 | 2 | 1 | 1 | 1 | 2 | 10 |
| 4 | 1 | 1 | ND | ND | ND | 1 | 1 | 1 | 4 |
| 5 | ND | ND | ND | 1 | 2 | ND | ND | ND | 13 |
| 6 | ND | ND | ND | ND | 2 | ND | ND | ND | 10 |
| 7 | ND | ND | ND | 2 | 1 | ND | ND | ND | 3 |
| 8 | 1 | ND | 1 | ND | 1 | 1 | ND | 1 | 10 |
| 9 | 1 | 2 | ND | 1 | ND | 2 | 2 | ND | 13 |
| 10 | 2 | 1 | 1 | ND | 1 | 2 | 1 | 1 | 10 |

ND: not detectable

INDUSTRIAL APPLICABILITY

The permselective separation membrane of the present invention has well-balanced separation properties, highly stable safety and performance, and also can be smoothly assembled into a module. Therefore the permselective separation membrane can be preferably used for hollow fiber type blood purifier in hemodialysis treatment of chronic renal insufficiency with high water permeability. The production method of the present invention makes it possible to produce the permselective separation membrane having the features described above economically and safely.

The invention claimed is:

1. A permselective separation membrane which is characterized in that:
   (a) the permselective separation membrane is made mainly of a polysulfone-based polymer and polyvinyl pyrrolidone;
   wherein a ratio [D]/[C] between the polyvinyl pyrrolidone content [D] in the uppermost layer of a surface on non-blood contacting side and the polyvinyl pyrrolidone content [C] in the uppermost layer of a surface on blood contacting side is 1.1 or higher, wherein the polyvinyl pyrrolidone content [C] in the uppermost layer of a surface on the blood contacting side of the permselective separation membrane is from 20 to 40% by weight and wherein the polyvinyl pyrrolidone content [D] in the uppermost layer of a surface on non-blood contacting side of the permselective separation membrane is from 25 to 50% by weight;
   (b) when bovine blood at a temperature of 37° C. having hematocrit value of 30% and containing 6 to 7 g/dl of total proteins and sodium citrate is flowed through a module comprising the permselective separation membrane at a flow rate of 200 mL/min, and a filtration rate of 20 ml/min.,
      (i) a sieving coefficient of albumin [A] becomes not less than 0.01 and not more than 0.1 after 15 minutes; and
      (ii) a sieving coefficient of albumin [B] becomes not less than 0.005 and less than 0.04 after 2 hours.

2. The permselective separation membrane according to claim 1, wherein the sieving coefficient of albumin [B] after 2 hours is less than the sieving coefficient of albumin [A] after 15 minutes.

3. The permselective separation membrane according to claim 1, wherein the sieving coefficient of albumin [A] after 15 minutes and the sieving coefficient of albumin [B] after 2 hours satisfy a relation of [B]/[A]=0.1 to 0.4.

4. The permselective separation membrane according to claim 1, wherein clearance of α1-microglobulin is not less than 15 ml/min (1.0 m$^2$).

5. The permselective separation membrane according to claim 1, wherein the amount of α1-microglobulin adsorbed is within a range from 2.0 to 20 mg/m$^2$.

6. The permselective separation membrane according to claim 1, wherein a skin layer thickness of the permselective separation membrane is from 0.1 to 1.2 μm.

7. The permselective separation membrane according to claim 1, wherein a membrane thickness of the permselective separation membrane is from 25 to 45 μm.

8. The permselective separation membrane according to claim 1, wherein polyvinyl pyrrolidone is not substantially crosslinked.

9. The permselective separation membrane according to claim 1, wherein the polyvinyl pyrrolidone content in a layer near the surface on blood contacting side of the permselective separation membrane is from 5 to 20% by weight.

10. The permselective separation membrane according to claim 1, wherein an aperture ratio of the surface on blood contacting side of the permselective separation membrane is from 20 to 35%.

11. The permselective separation membrane according to claim 1, wherein the permselective separation membrane is a hollow fiber membrane.

12. The permselective separation membrane according to claim 11, wherein a burst pressure of the hollow fiber membrane is 0.5 MPa or higher.

13. The permselective separation membrane according to claim 11, wherein thickness deviation of the hollow fiber membrane is 0.6 or more.

* * * * *

UNITED STATES PATENT AND TRADEMARK OFFICE
CERTIFICATE OF CORRECTION

| | |
|---|---|
| PATENT NO. | : 7,922,007 B2 |
| APPLICATION NO. | : 10/599128 |
| DATED | : April 12, 2011 |
| INVENTOR(S) | : Kimihiro Mabuchi et al. |

Page 1 of 1

It is certified that error appears in the above-identified patent and that said Letters Patent is hereby corrected as shown below:

<u>First Page Col 1, Line 1 Item (30) (Foreign Application Priority Data)</u>
Delete "P2004-083712" and insert -- 2004-083712 --, therefor.

<u>Column 55, Line 51 (Approx.)</u>
In Claim 1, delete "mL/min," and insert -- ml/min. --, therefor.

Signed and Sealed this
Sixteenth Day of August, 2011

David J. Kappos
*Director of the United States Patent and Trademark Office*